(12) United States Patent
Mukherjee et al.

(10) Patent No.: US 7,634,002 B2
(45) Date of Patent: Dec. 15, 2009

(54) METHOD AND APPARATUS FOR UPDATING SEQUENCES IN A BITSTREAM

(75) Inventors: Debargha Mukherjee, San Jose, CA (US); Geraldine Kuo, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1132 days.

(21) Appl. No.: 10/724,556

(22) Filed: Nov. 26, 2003

(65) Prior Publication Data

US 2005/0110662 A1 May 26, 2005

(51) Int. Cl.
- *H04N 7/12* (2006.01)
- *H04N 11/02* (2006.01)
- *H04N 11/04* (2006.01)
- *H04B 1/66* (2006.01)

(52) U.S. Cl. .................................. 375/240.01
(58) Field of Classification Search ............. 375/240.01
See application file for complete search history.

(56) References Cited

U.S. PATENT DOCUMENTS 7,287,217 B2 * 10/2007 Kuznetsov et al. .......... 715/235

2004/0210557 A1 * 10/2004 Uluakar et al. ................. 707/1
2008/0071918 A1 * 3/2008 Jones et al. ................ 709/230

OTHER PUBLICATIONS

"Proposals for end-to-end Digital Item Adaption using Structured Scalable Meta-formats (SSM)," Debargha Mukherjee, et al., ISO/IEC JTC1/SC29/WG11MPEG2002/M8898 Shanghai, Oct. 2002.
"Structured Scalable Meta-formats (SSM) version 1.0 for content agnostic digital Item Adaption," Debargha Murherjee, et al., ISO/IEC JTC1/SC29/WG11 MPEG2002/M9131 Awaji, Japan Dec. 2002.
"Structured Scalable Meta-formats (SSM) for Digital Item Adaptation," Debargha Mukherjee, et al., HPL-2002-326 Nov. 2002.
Panis G et al: "Bitstream syntax description: a tool for multimedia resource adaptation within MPEG-21" Signal Processing. Elsevier Science Publishers, NL, vol. 18, No. 8, Sep. 2003.

* cited by examiner

*Primary Examiner*—Nhon T Diep

(57) ABSTRACT

A method and apparatus for updating sequence fields in a bitstream subsequent to bitstream segment drops is provided. Each sequence has a sequence field with a sequence count element associated with a location in the bitstream. The design includes removing each sequence count element pointing to dropped data from the sequence field and updating each sequence field subsequent to each sequence field formerly pointing to dropped data to include sequence count elements pointing to associated locations in the bitstream.

20 Claims, 27 Drawing Sheets

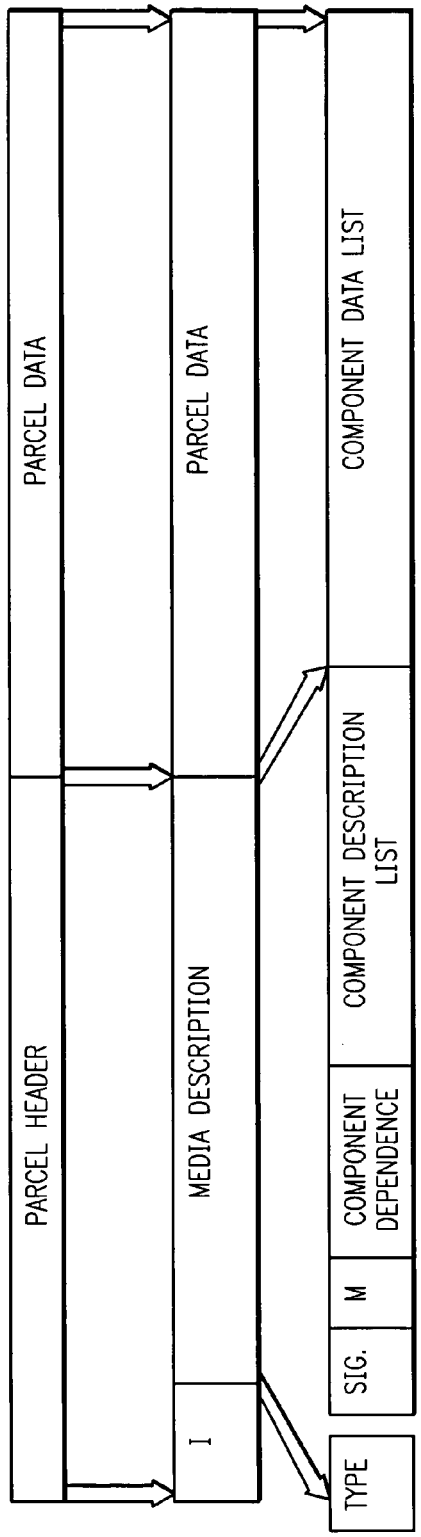
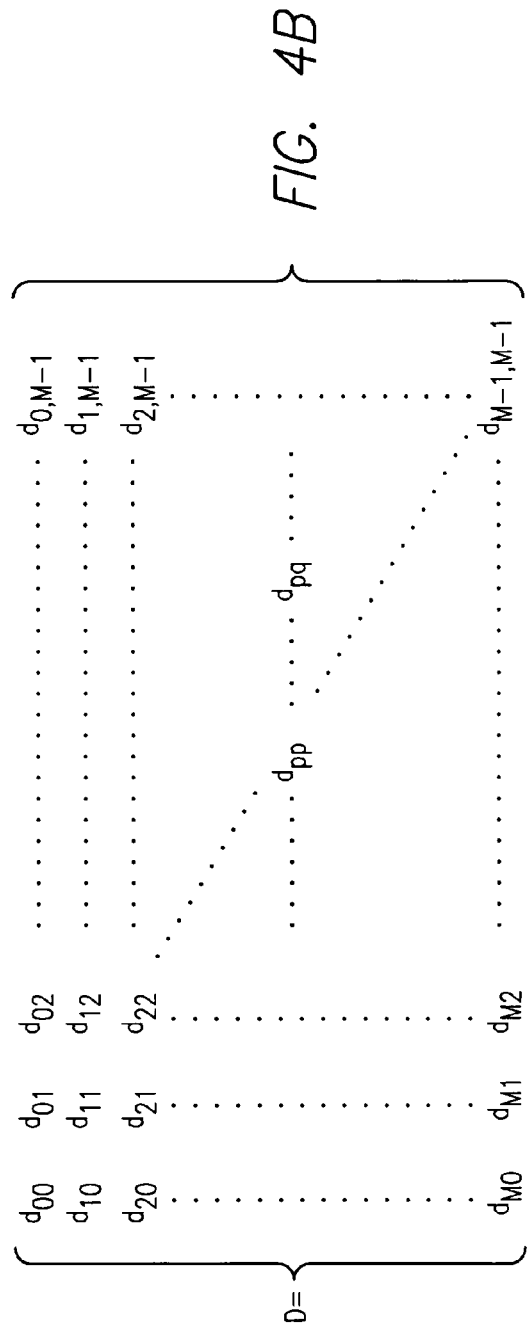
FIG. 4A
FIG. 4B

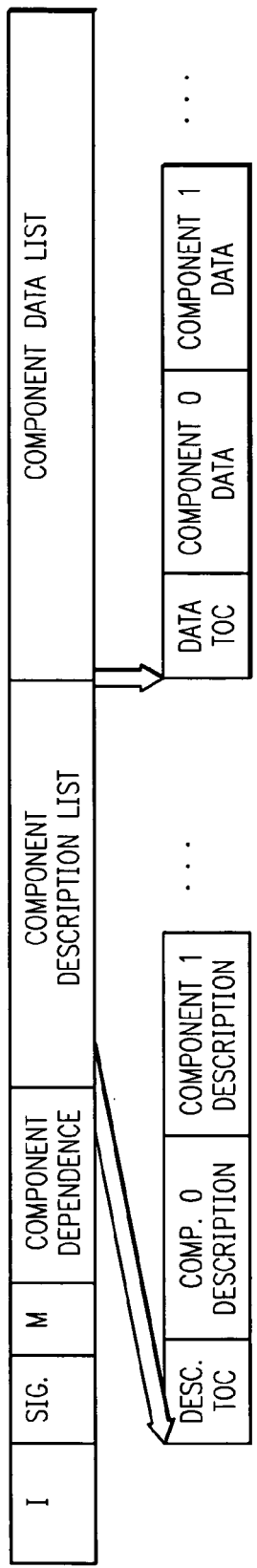
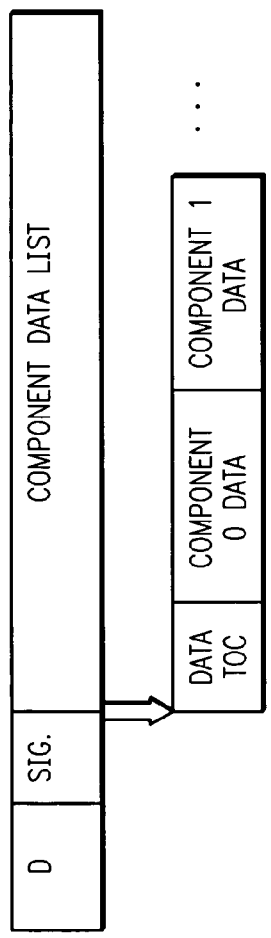
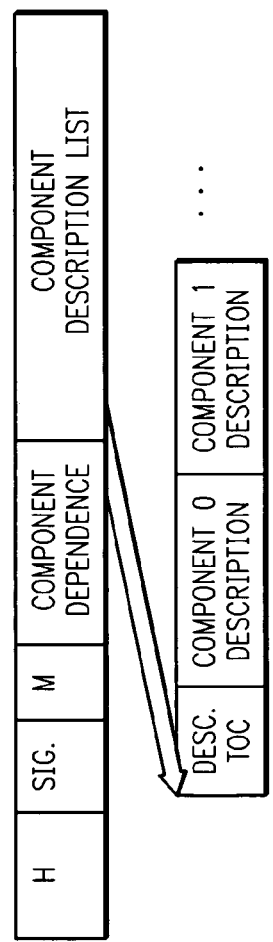
FIG. 5A
FIG. 5B
FIG. 5C

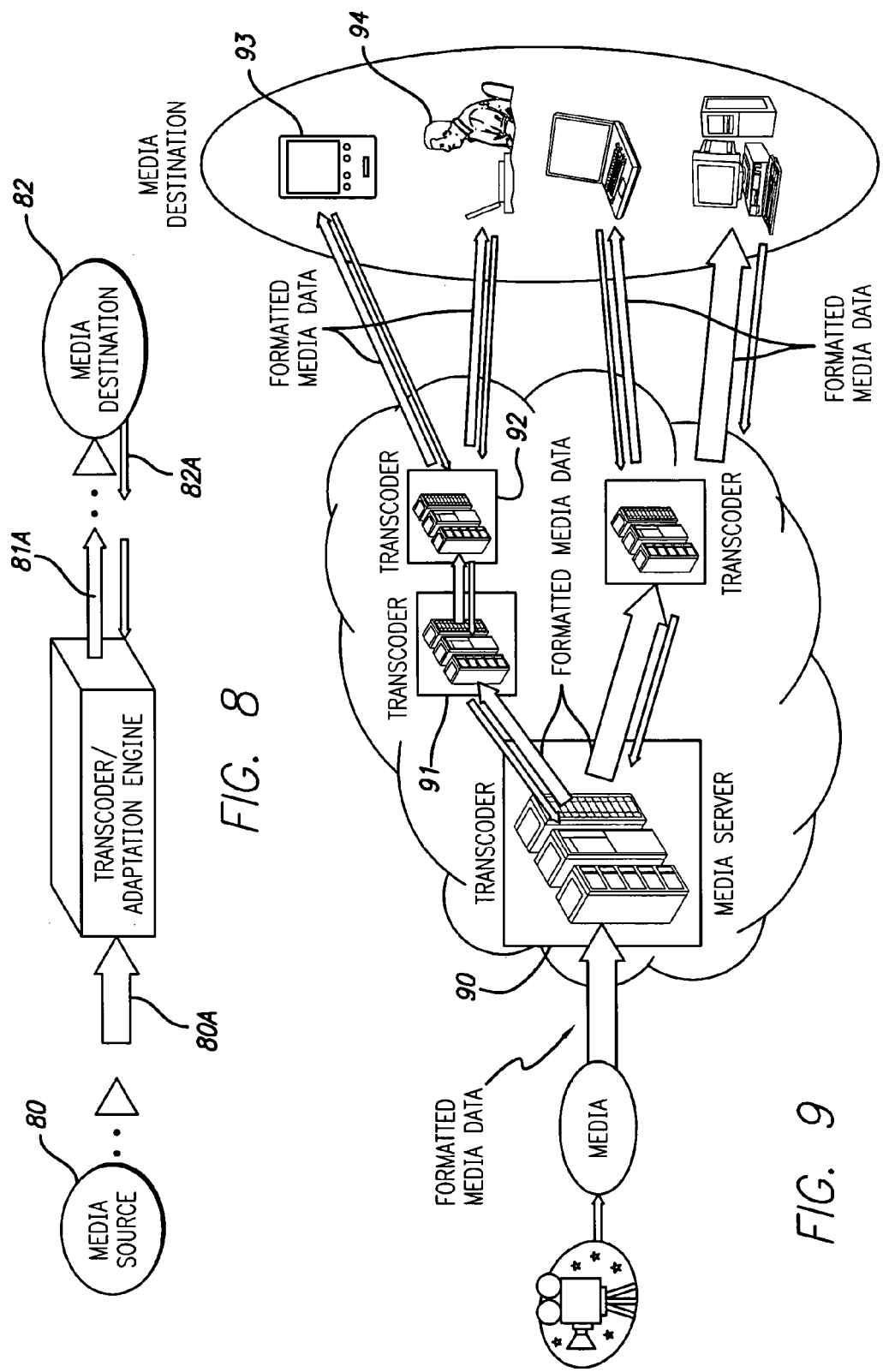

FIG. 16
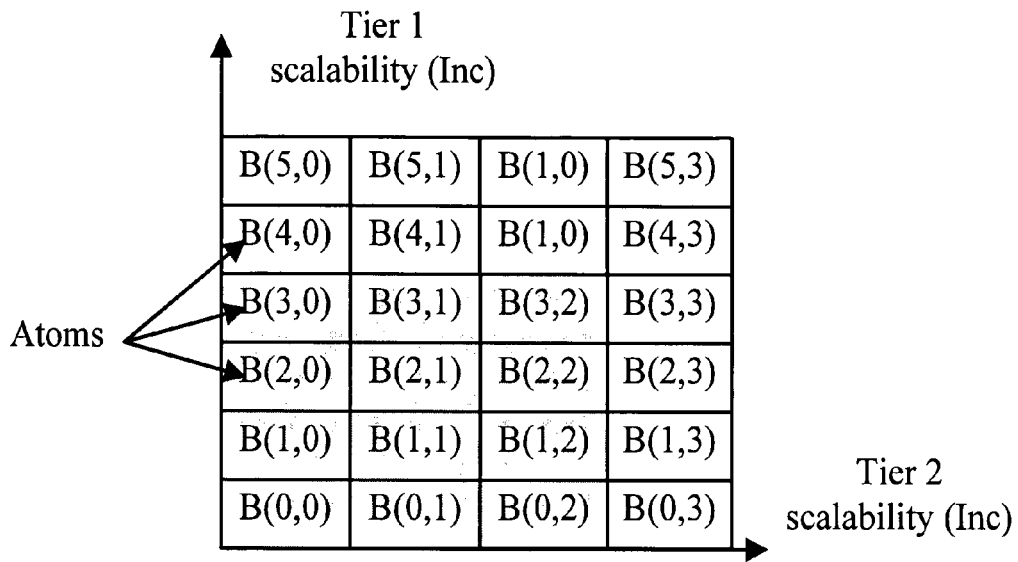
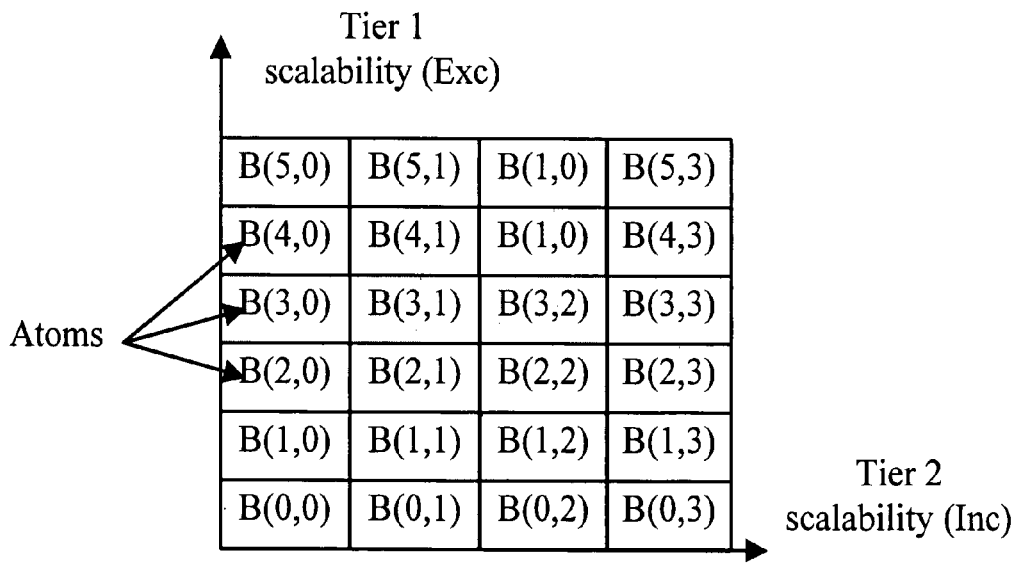
FIG. 17

METHOD AND APPARATUS FOR UPDATING SEQUENCES IN A BITSTREAM

BACKGROUND OF THE INVENTION

1. Field of the Invention

The present invention relates generally to the art of data bitstream encoding and decoding, and more specifically to updating sequences within a bitstream.

2. Description of the Related Art

Users access the Internet today using various devices capable of delivering content in a variety of formats. Faced with variations in the type of content that may be transmitted or received from a user, a rigid media representation format, producing decompressed content only at a fixed resolution and quality, presents various limitations. Certain users may not have the ability to receive any content, or may receive poor quality and/or resolution data considering the capabilities of their network connections and/or accessing devices. The inability to provide content in formats compatible with new devices has had a tendency to inhibit the growth of new rich media and the devices on which they are used, because such rich content can be used only to high end devices.

One known technique for providing media content to users having a variety of capabilities and preferences is to provide multiple versions of the media suiting a variety of capabilities and preferences. While this approach works with delivery models where the recipient directly connects to the media originator, for any other scenario, significant redundancy and inefficiency may be introduced, leading to wastage of bandwidth and storage. Redundancies and inefficiencies are particularly problematic when providing a wide range of choices catering to a large consumer base, thereby mandating maintenance of numerous versions differing in a variety of ways.

To combat these redundancies and inefficiencies, scalable compression formats have been proposed. Scalable compressed representations can accommodate all users by automatically addressing a given user's computing power and connection speed. One example of a scalable compressed representation is JPEG2000. JPEG2000 is a scalable standard for still images that seeks to combine image quality scalability and image resolution scalability in a format specific to the universal JPEG2000 compressed data, enabling distribution and viewing of images of various qualities and resolutions using various connections and devices. To obtain the full benefits of JPEG2000 format scalability, an infrastructure that specifically supports transcoding of JPEG2000 content and delivery to a heterogeneous recipient base is required.

Video standards MPEG-X and H.26X have been developed that incorporate various forms of scalability for delivering media content such as streaming video to a heterogeneous recipient base. However, this type of scalable video over the Internet is limited to maintaining multiple versions for a few different types of connections, because complete infrastructures that support transport of scalable video formats are nonexistent.

Various types of bitstream scalability can be devised depending on the type of media content addressed. For example, SNR (quality) scalability refers to progressively increasing quality as more and more of the bitstream is included, and applies to most types of media. Resolution scalability refers to fineness of spatial data sampling, and applies to visual media such as images, video, 3D etc. Temporal scalability refers to fineness of sampling in the time-domain, and applies to video and other image sequences. Certain scalability pertains solely to audio, such as number of channels and sampling frequency. Different types of scalability can co-exist, so as to provide a range of adaptation choices.

In new rich media, different media elements are often bundled together to provide a composite media experience. According to one known technology, an image with audio annotation and some animation provides a composite experience of a presentation using three media elements (an image, an audio clip, some animation data). Composite rich media models such as this lead to newer types of scalability specific to the media, because certain non-critical elements of the composite may be dropped to accommodate other more critical ones within the limited resources of a recipient.

Security is an added critical factor to content deployment. Full end-to-end security may only be available using delivery architectures where no codec-specific elements are used in the entire path from, and perhaps including, the content server to the receiving terminal. Any point in the network using a codec-specific element presents a potential security breach point.

In both unsecured and secured transmission scenarios, midstream content adaptation to cater to diversity is desirable, i.e. the ability to alter data at a midpoint between transmission and receipt. Data that may be altered may include various portions of the bitstream, including but not limited to data fields, data sequences, and the like. Currently, secure end-to-end streaming using scalable packets exists. However, to enable secure content adaptation in a content-agnostic manner, it is necessary to enable network adaptation engines to make decisions about possible adaptations, even when the adaptations do not have all information regarding the semantics of the required decision.

With respect to data sequences, after altering or adapting the bitstream in midstream, sequence count fields may point to dropped data, i.e. data no longer available. Decoding and updating the sequence fields may present a significant undertaking from a resource and timing viewpoint and be undesirable.

Based on the foregoing, it would be advantageous to offer a system and method of bitstream transmission capable of performing decision making tasks in a relatively compact way using a content-agnostic mathematical abstraction in generic descriptors readily able to be processed by a device such as an adaptation engine. Further, a system that enables updating of bitstreams, including but not limited to sequence fields, without decoding the bitstream may provide advantages over previous designs.

SUMMARY OF THE INVENTION

According to a first aspect of the present design, there is provided a method for updating sequence fields in a bitstream subsequent to bitstream segment drops. At least one sequence field includes a sequence count element and the at least one sequence field points to dropped data. The method comprises removing each sequence count element formerly pointing to dropped data from the sequence field, and updating each sequence field subsequent to each sequence field pointing to dropped data.

According to a second aspect of the present design, there is provided a method for updating sequence fields within at least one sequence in a bitstream subsequent to bitstream segment drops, wherein at least one sequence field includes a sequence count field and the at least one sequence field points to dropped data. The method comprises replacing one sequence count field with a countOnly field, wherein replacement with a countOnly field enables processing an associated sequence value for the dropped data.

According to a third aspect of the present design, there is provided a method for updating sequences in a bitstream having dropped data located therein, each sequence comprising a sequence field having a sequence count element associated with a location in the bitstream. The method comprises removing each sequence count element pointing to dropped data from the sequence field, and updating each sequence field subsequent to each sequence field formerly pointing to dropped data to include sequence count elements pointing to associated locations in the bitstream.

According to a fourth aspect of the present design, there is provided a method for evaluating a sequence. The method comprises obtaining starting sequence parameters, obtaining all children of the sequence, evaluating the child type of each sequence obtained, and selectively updating sequence values based on the child type of each sequence child obtained.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which:

FIG. 4A illustrates the non-media type specific format having a component dependence matrix D that defines the manner in which components are dependent;

FIG. 4B shows an example of a dependence matrix D in accordance with the present invention;

FIGS. 5A-5C show non-media type specific formats having different type fields;

FIG. 8 shows a system for scalable encoded media delivery;

FIG. 9 is an example of a structure for implementing the system and method of the present invention;

FIG. 16 shows layer drops for a first tier example;

FIG. 17 represents layer drops for a second tier example;

DETAILED DESCRIPTION OF THE INVENTION

Figures 1, 2A:
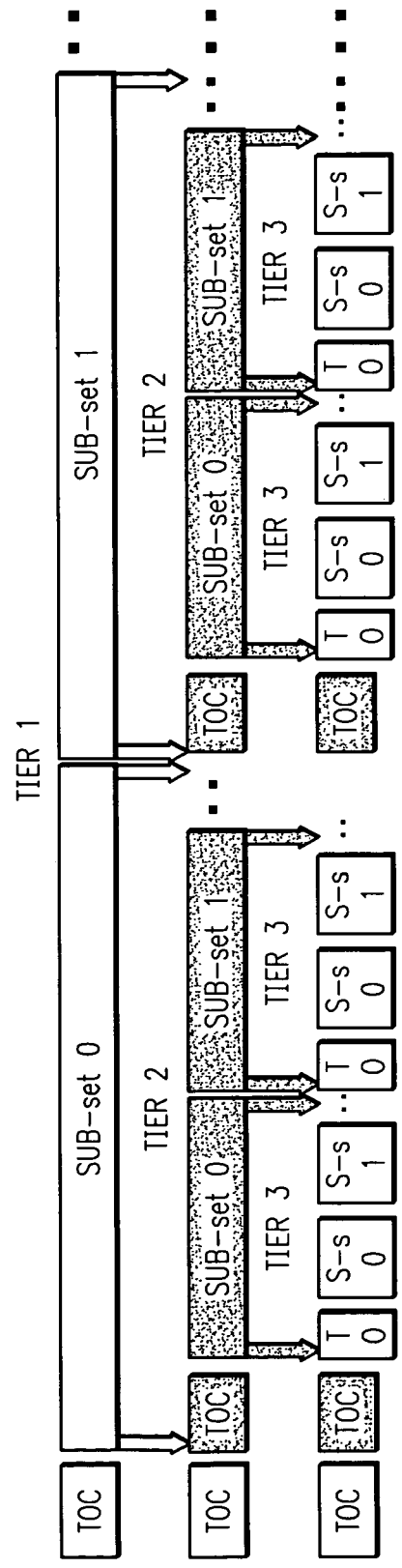
FIG. 1 shows a non-media type specific format of scalable media data.
FIG. 2A illustrates an example of media data formatted into a non-media type specific data structure having multi-tier scalability.

In general, the present invention is a system and method for enabling format agnostic updating of monotonic sequence fields after adaptation by bitstream segment drops. The system, method, and format provide seamless, flexible delivery to media destinations having a variety of receiving attributes such as receiving capabilities and preference, adapted based on the receiving capabilities of the media destination and modification thereof at points in between.

It is to be specifically understood that the following description details one specific example of the invention disclosed herein, and is not intended to be limiting in that regard. Other implementations, including implementations employing different formats, languages, and elements are intended to be within the scope of the present invention.

As used herein, the term "feature" or "feature variable" ise used interchangeably with the term "attribute" to generally refer to certain quantifiable properties relevant to the experience of a single media component or jointly for a set of media components. Features or attributes defined for a single component are called "elemental features," while those defined over more than one component are called "product features". In XML, for example, some examples of elemental feature variables are Codesize, MeanSquaredError, SpatialResolution, TemporalResolution and so forth. One example of a product feature variable is PerceptualRichness, which is a product feature of the adaptation points of audio and image components, but which cannot be expressed as a function of individual features from the two components. Attributes, features or feature variables are part of the larger set of adaptation variables, where adaptation variables are expressed quantitatively in terms of floating numbers, referred to as variable values, defined over the discrete space of all possible adaptation choices.

Structured Scalable Meta-Format (SSM)

A scalable encoded media bitstream is generally defined as an encoded bitstream comprised of a plurality of smaller encoded subsets of the bitstream. When grouped together, the smaller encoded subsets can produce media representations having varying scaling for specific scalable attributes of the media bitstream such as quality, resolution, and so forth. For instance, if a scalable encoded bitstream having a plurality of encoded subsets includes resolution attributes, all of the encoded subsets will provide a full resolution representation. Lower resolution can be obtained by omitting subsets in mid bitstream or truncating subsets from the end of the bitstream. Even lower resolution can be obtained by again dropping or truncating additional subsets. After dropping or truncating subsets, the network can repack the remaining bitstream subsets to adjust for the lost data positions of the dropped subsets. In general, the operation of dropping, truncating, and rearranging subsets is generally referred to as transcoding. Such a design is presented in currently co-pending U.S. patent application Ser. No. 10/196,506, entitled "System, Method, and Format thereof For Scalable Encoded Media Delivery," inventor Debargha Mukherjee et al., filed Jul. 15, 2002.

A scalable bitstream can have more than one kind of scalability. Moreover, different types of scalability (e.g. signal-to-noise ratio (SNR), resolution, temporal, interactivity) can apply to different types of media. In addition, scalable encoded bitstreams contain nested tiers of scalability.

Generation of a scalable encoded media bitstream is well known in the field of media delivery. For example, in JPEG2000 image compression, wavelet decomposition of an original media bitstream can generate a scalable encoded media bitstream for the express purpose of obtaining blocks, or sub-bands, of coefficients. Sub-bands of the coefficients may be scanned in such a way so as to obtain a bit-plane by bit-plane encoding of the original media bitstream wherein each encoded bit-plane is represented by a plurality of bitstream subsets. Other known techniques of generating scalable encoded media bitstream include video compression and audio compression. The system and method of the present invention are applicable to any scalable encoded bitstream generated by any technique.

FIG. 1 shows a non-media type specific format for scalable encoded media data including a first portion 10 and a second portion 11. The first portion 10 corresponds at least to non-media type specific scalability attributes. Non-media type specific scalability attributes, in general, include attributes common to all media types. For instance, non-media type specific scalability attributes can include but are not limited to size (corresponding to the size of the bitstream), display resolution (required to display the content obtained from the bitstream), SNR (a measure of fidelity of the content obtained from the bitstream to the uncompressed version), and processing power (required to experience the media). Each attribute may be, for example, associated with an n-byte code that uniquely identifies the attribute. The system can use reserved codes for standardized attributes having universal meaning across media types, and other bytes can be set aside for future attribute type codes. Attributes can be expressed by standardized values to preserve uniformity across all media types and capabilities. Attributes can, for example, be quantized by a "decreasing" code value or "increasing" code value. The first portion 10 also includes non-media type specific data structure information of the second portion 11. In one embodiment, the data structure information relates to the dimensions of a multi-dimensional representation of the scalable encoded media bitstream.

The second portion 11 corresponds to the scalable encoded media data arranged in a content independent indexable data structure. Irrespective of the content of the encoded media data, the system arranges the encoded media data into a generic format, enabling performing generic transcoding where transcoding is performed without knowledge of the actual media content and without decrypting or decoding the media data. This agnostic attribute enables a single infrastructure or transcoder to deliver many types of media content. In addition, the format simplifies transcoding operations such as truncation, bitstream skips, and repacking to generate a scaled version of the encoded bitstream without knowledge of the actual content or compression scheme previously applied to the encoded bitstream. Moreover, since the content independent indexable nested format is not specific to any type of media, the format can be used for both media that exists currently as well as future media types.

The scalable encoded media data may be arranged as shown in FIG. 2A, where each tier corresponds to a different type of scalability. The data is indexable using multiple TOCs (tables of contents) where each tier is indexable by its corresponding TOC. Alternately, the second portion may be indexed with a single TOC. For instance, as shown in FIG. 2A, a first tier of the bitstream may include a first bitstream encoded subset (Subset 0) and a second bitstream encoded subset (Subset 1). As described above, scalability can be achieved by grouping subsets of the bitstream to provide scalability to a particular tier. For instance, a first scalability might be obtained from only Subset 0, whereas a second scalability might be provided from the combined subsets of Subset 0 and 1. The type of scalability that the first tier provides depends on the actual content of the first and second Subsets. Each of the first and second bitstream Subsets of the first tier can be further broken down into first and second bitstream subsets of the second tier (Subsets 0 and 1). Again, the content of the second tier subsets determines the type of scalability provided by the tier. A third tier is similarly broken down. One example of this type of multi-tier scalable bitstream is a JPEG2000 bitstream. In one of the progression modes of JPEG2000, the highest tier corresponds to resolution scalability and within the resolution scalable subsets are nested a second tier of signal-to-noise ratio (SNR) subsets. In the example shown in FIG. 2A, the TOCs are provided, in part, for random access and fast identification of subsets that may be dropped or truncated during transcoding operations.

Media content distributed in each transmission instance is referred to as a "parcel." Each parcel in the generic case may comprise multiple media components to provide a composite experience. For example, one component may be an image and a second component may be audio annotation accompanying the image. Both components may be distributed together in a single parcel to provide an experience of image viewing with audio annotation. Each media component is a coded unit of data representable in the scalable non-media specific format, along with a header containing its description. The overall media description for a parcel includes descriptions for the individual components in its header, while the overall parcel data consists of (scalable) coded data for the individual components.

Generally, a parcel is a super construct of components that essentially define adaptation boundaries. It may be fashioned from multiple independent scalable components to provide a composite experience. The overall bitstream consists of multiple parcels, often all of the same type. Parcels are typically adapted almost independently and often sequentially in a transcoder or adaptation engine, with limited dependency between successive parcel adaptations. The size of a parcel can vary depending on the design, and may range from an entire scalable compressed file to a network transmission packet. Continuing with our previous example of image with audio annotation, both the image and audio components may constitute a parcel, but there may be multiple parcels in a composite bitstream to produce a slide show with audio. An alternative example arises in scalable video coding where each Group of Pictures (GOP) is represented independently as a scalable component. If GOPs are to be adapted independently, then the parcel is the GOP, and contains a single component.

Figure 3A:
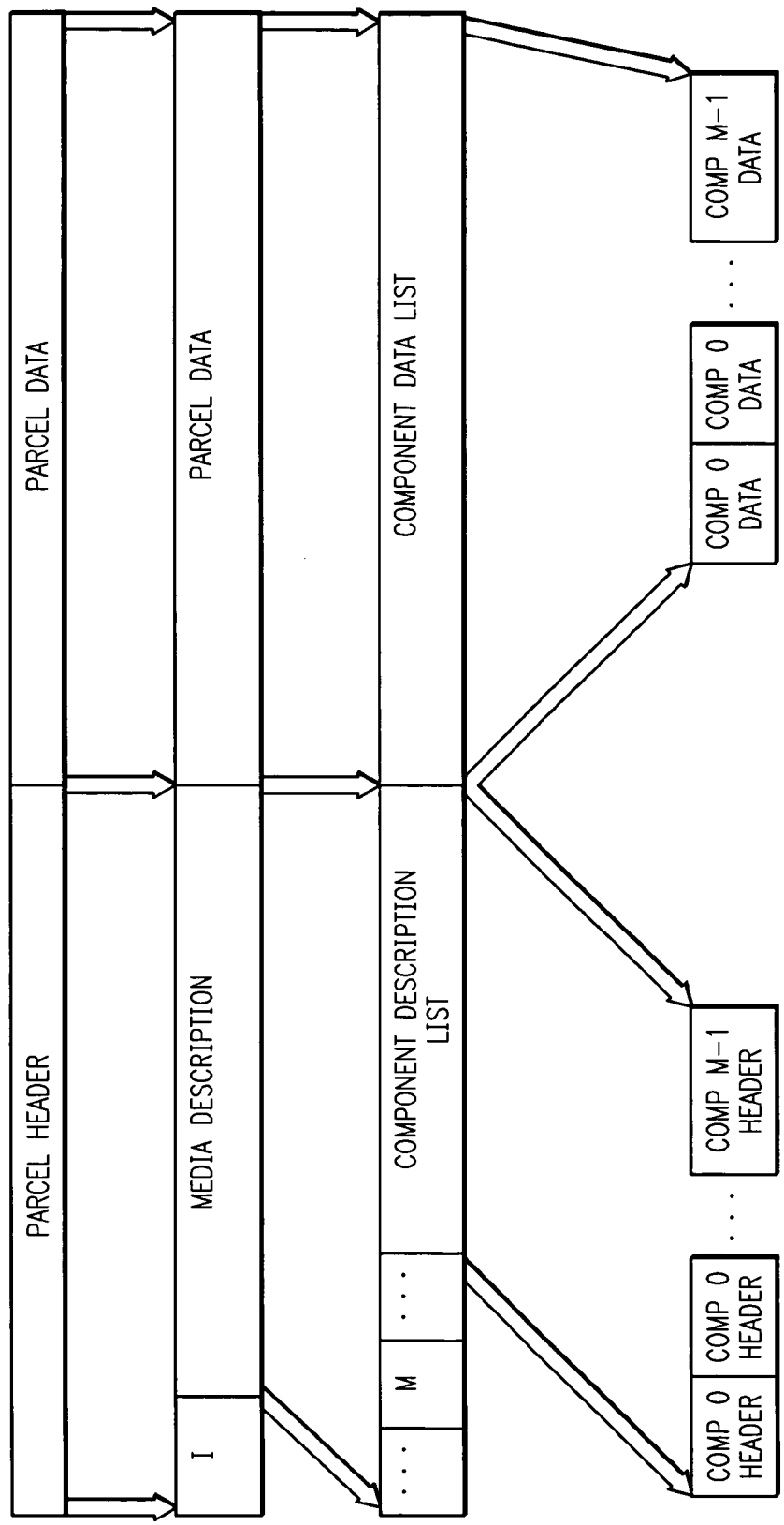
FIG. 3A shows an alternate example of non-media type specific format of scalable media data including parcel component and parcel data information.

In general, each parcel may include two portions: the parcel header and the parcel data (FIG. 3A). In general, the parcel header portion contains, among other things, the number of media components and individual headers for each of the constituent components. The parcel data portion contains the encoded data for the individual components.

Figure 3B:
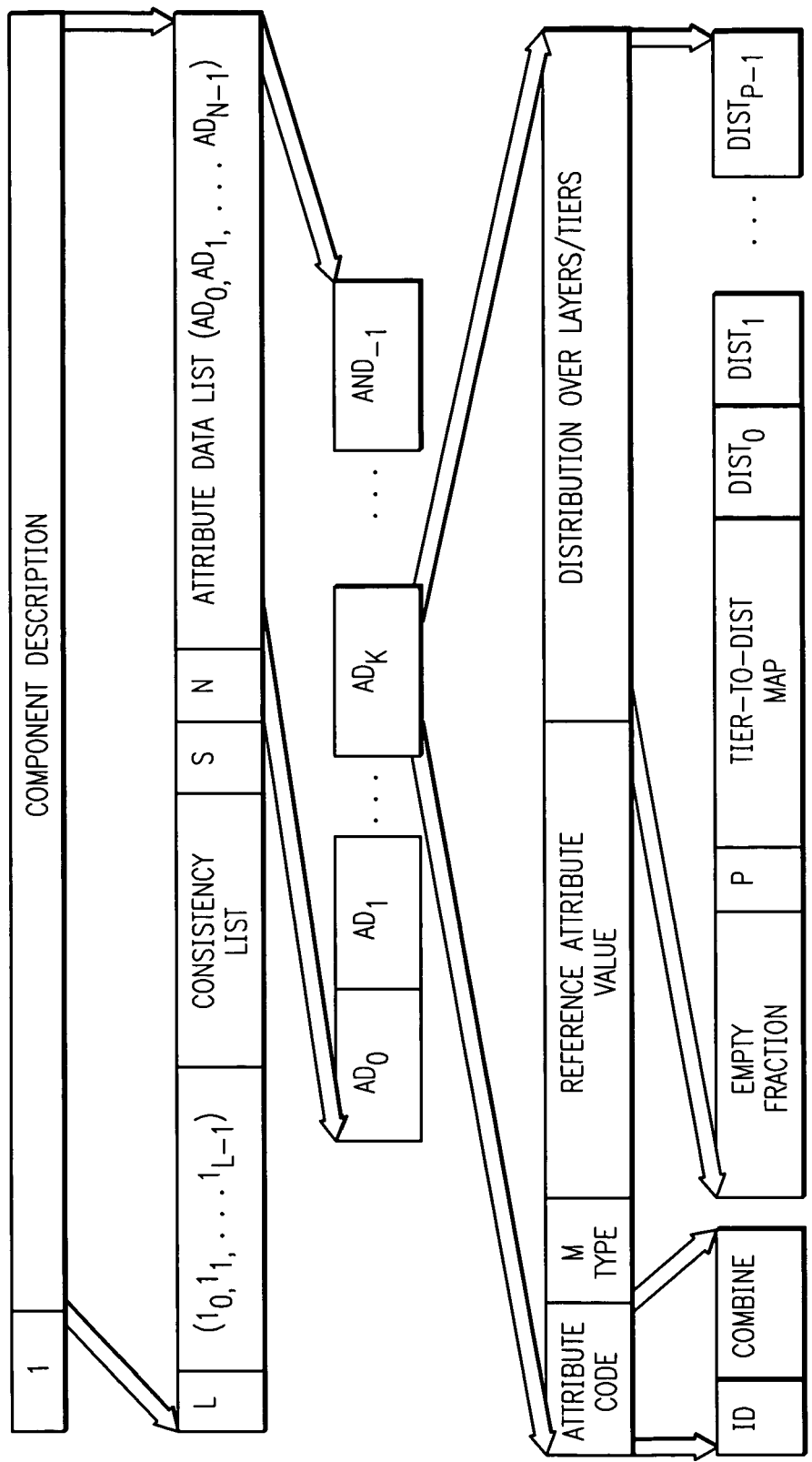
FIG. 3B is an example of a component header employed within the non-media type specific format of scalable media data.

An alternate format for each media component header is shown in FIG. 3B. This header includes a flag specifying whether the media component is non-media type specific formatted in accordance with the present design or not. If not, the network performs no transcoding, and the network forwards the entire media parcel to the outbound connection(s). The header in this case contains no component description. However, if the flag indicates that the parcel is scalable and non-media type specific format compliant, then the component description may follow in the header.

Figure 2B:
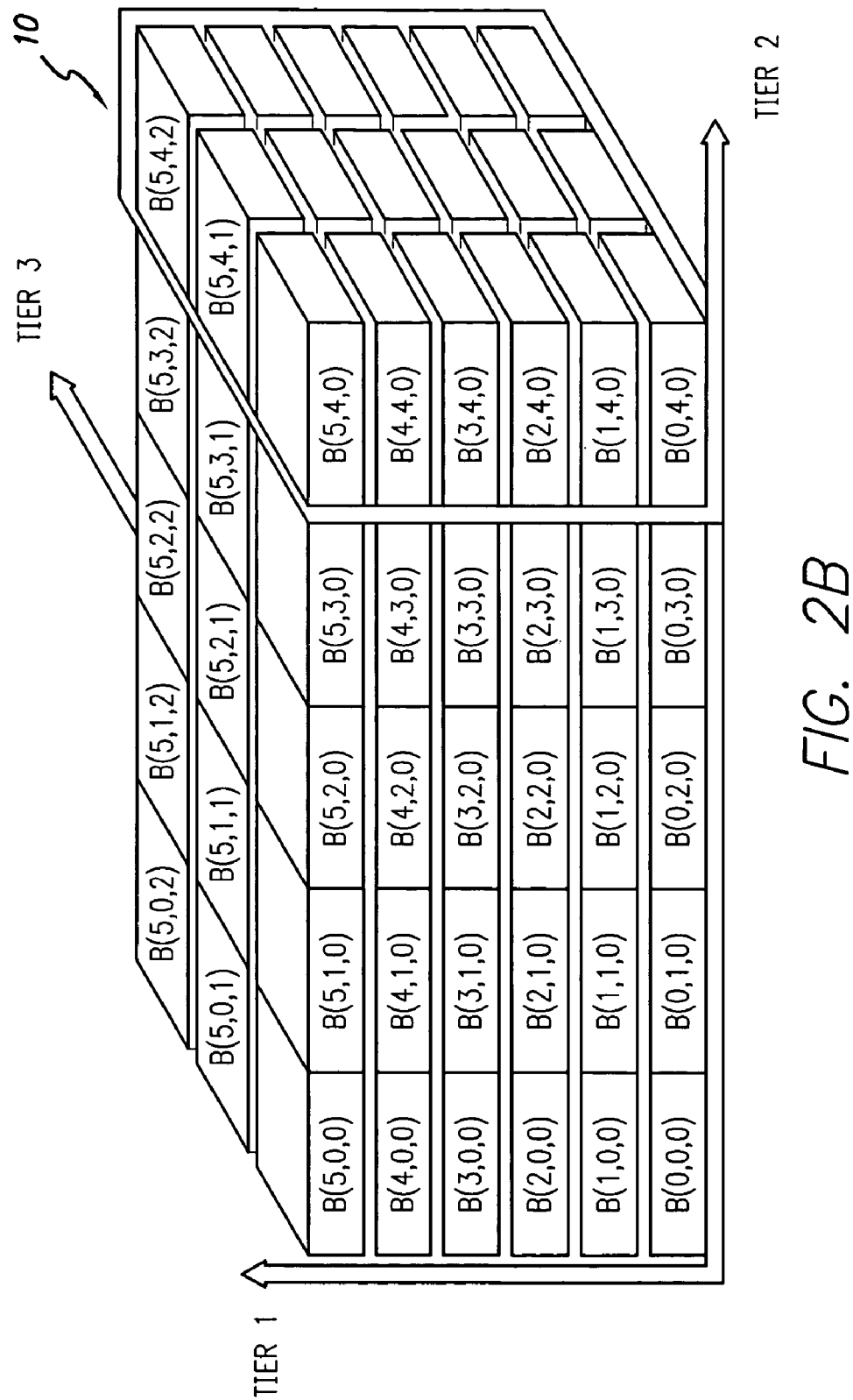
FIG. 2B is an alternative representation of scalable encoded media data corresponding to the representation shown in FIG. 2A.

The component description contains L, the number of nested scalability tiers corresponding to the number of dimensions of the cube shown in FIG. 2B. The component description further contains $l_i$, a list containing the number of layers in each tier i corresponding to the number of rows in the cube. Also included is a consistency list, a subset of tiers used to preserve consistency across parcels of the same type, described in detail below.

Following the consistency list is a single bit flag, the Scalability_Flag, describing whether the data part is in a scalable format, or whether multiple independent versions are packaged within the bitstream. The same media component header may apply to both incremental scalable bitstreams as well as multi-version scalable bitstreams. In general, all transcoding operations for incremental and multi-version scalable bitstreams are identical, but in certain cases, the transcoder can increase bandwidth efficiency by having information that the scalable bitstream contains multiple independent versions.

The next field in the component description is N, the number of attributes relevant to the media component, followed by a list of required data for each attribute. In general, attributes are expressed quantitatively in terms of non-negative numbers, referred to as attribute values. For reserved attributes, quantification is standardized along with the code. For example, "size" can be expressed in Kbytes, display_resolution may be expressed as the diagonal width of the screen in number of pixels, processing_power may be denoted by CPU_speed multiplied by the Number_of_processors, and so on. Quantifying reserved attributes is standardized to preserve uniformity across different types of media. For most known attributes, the value N is either non-decreasing or non-increasing with layers. Adding more layers to a scalable media monotonically increases the attribute values.

Data for each attribute first contains the unique Attribute_code field identifying this attribute. The Attribute_code may include two fields, Attribute_ID and Attribute_combination. Attribute_ID is a unique identifier, and Attribute_combination describes how the attribute value changes when combined with another media component having the same attribute. Possible values for Attribute_combination include additive, maximum, minimum and so on. For example, size may be additive in combination, while display_resolution may be the maximum of individual components after combination. That is, when two or more media components are combined, the size required may be the sum of sizes required for all components. On the other hand, the display_resolution may be the maximum display resolution for all components. Overall, the unique Attribute_code not only identifies the attribute, but also defines its behavior when combined with another component.

The next field in attribute data is the Attribute_Monotone_Type, indicating how the attribute value changes with a layer increase. Possible types are monotonic non-decreasing, monotonic non-increasing, or non-monotonic with the number of layers. This is followed by Reference_Attribute_value, the numeric reference value of the attribute, which yield the attribute value for various layer drop options when multiplied with distribution values that follow. The Reference_Attribute_value field is followed by the Distribution over layers/tiers field. The Distribution over layers/tiers field specifies how the attribute value changes when layers are dropped. This specification is referred to as a distribution resulting from parallels to random vector cumulative distribution. This set of values is referred to as the "feature distribution," and may include elemental features and product features.

For elemental features, if there are L nested tiers in a component with $l_i$ layers in the ith tier, the network may provide a L-dimensional matrix of size $l_0 \times l_1 \times \ldots \times l_{L-1}$, whose $(j_0, j_1, \ldots, j_{L-1})^{th}$ element denoted $C(j_0, j_1, \ldots, j_{L-1})$, for $j_0=0,1, \ldots, l_0-1$; $j_1=0,1, \ldots, l_1-1$; $\ldots$ ; $j_i=0,1, \ldots, l_i-1$; $\ldots$ ; $j_{L-1}=0,1, \ldots$ ; $l_{L-1}-1$. $C(j_0, j_1, \ldots, j_{L-1})$ is a non-negative number specifying the value of the feature if $(j_0, j_1, \ldots, j_{L-1})$ is the adaptation point, along with an "empty" feature value $C_\phi$ specifying the feature value the component would have when the entire component is dropped, or in the case where none of the layers are transmitted. The total number of values transmitted may therefore be $1+l_0 \times l_1 \times \ldots \times l_{L-1}$. In operation, the network may specify these values with respect to a reference feature value for convenience. In this case, the elements $C(j_0, j_1, \ldots, j_{L-1})$ multiplied by the reference value provides the true feature value for adaptation point $(j_0, j_1, \ldots, j_{L-1})$. The reference multiplied by the last fraction $C(l_0-1, l_1-1, \ldots, l_{L-1}-1)$ yields the full feature value, or the value the feature would have if the content were transmitted without any layer dropping adaptation for incremental tiers and with the highest layer versions included for exclusive tiers. Multiplying with the reference also may apply to the empty feature value $C_\phi$.

For example, considering the first two tiers of JPEG2000 RLCP progression mode, the distribution specifications for features Codesize and DisplayResolution may appear as shown in FIGS. 3A and 3B. Both are non-decreasing monotonic. In FIGS. 3A and 3B, four spatial scalability layers are nested with three SNR scalable layers each. In FIG. 3B, the DisplayResolution attribute does not change with SNR scalable layers. As a result of transcoding, if a SNR layer and two spatial layers are dropped, the Codesize attribute of the transcoded bitstream shown shaded in FIG. 19A would be 0.18 times the reference Codesize value, while the DisplayResolution attribute would be 0.25 times the reference DisplayResolution value.

Cumulative distributions may be expressed approximately using products of one or more individual lower-dimensional marginal distributions. In this case, the element $C(j_0, j_1, \ldots, j_{L-1})$ is obtained approximately as $\hat{C}(j_0, j_1, \ldots, j_{L-1})$ using a product combination of marginal distributions. The JPEG2000 specification involves P lower dimensional cumulative distributions $C_i(.)$ that cover L dimensions together: $\hat{C}(j_0, j_1, \ldots, j_{L-1}) = C_0(\ ) \times C_1(\ ) \times \ldots \times C_{P-1}(\ )$. The empty feature $C_\phi$ may be transmitted separately.

Figure 3C:
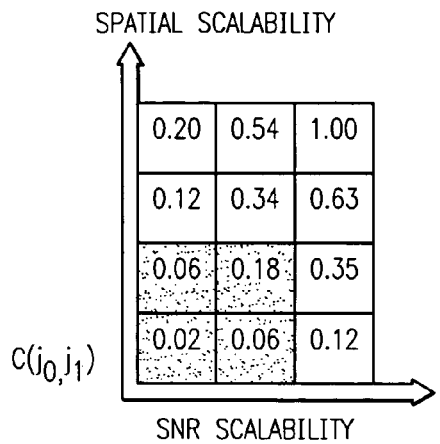
FIGS. 3C-3F show examples of attribute distribution specifications employed within the non-media type specific format of scalable media data.
Figure 3D:
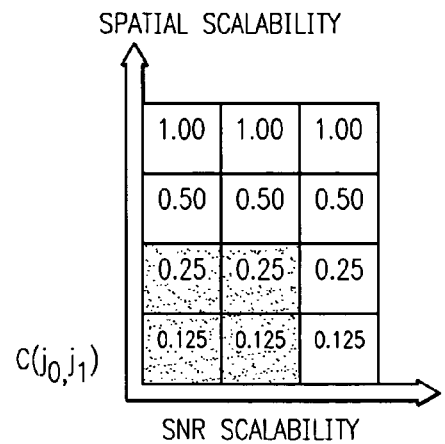

FIGS. 3C and 3D illustrate a JPEG2000 example of approximate specifications using two one-dimensional marginals and the eventual approximate distributions generated. The Distribution description contains first the empty fraction $C_\phi$, followed by the number P indicating the number of product distributions specified, followed by a list of L P-ary elements, one for each of L tiers, indicating which tier map to which distribution. Following this are the specifications of the P distributions in order.

Figure 3E:
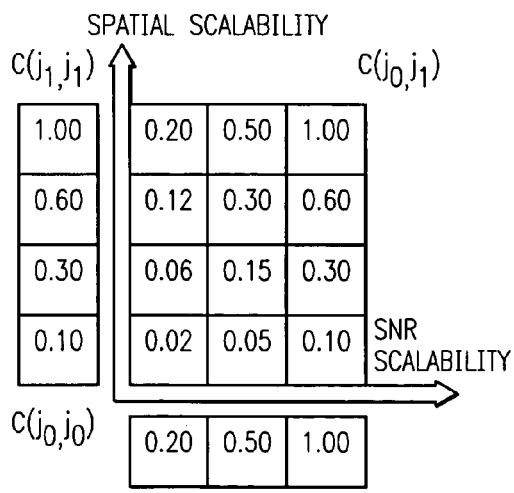
Figure 3F:
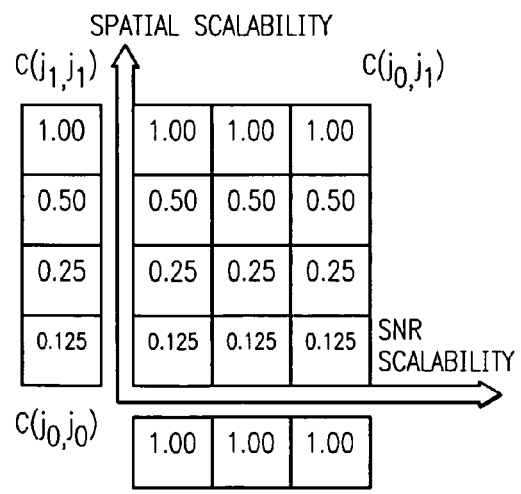

In another aspect for the JPEG2000, the approximate specifications using two one-dimensional marginals and the eventual approximate distributions generated can be as shown in FIGS. 3E and 3F.

FIG. 4A shows another aspect of the non-media type specific format having a component dependence matrix D that defines the manner in which components are dependent. In particular, components may or may not be excluded during transcoding. Certain components in the media must be included after transcoding even if it is only the lowest scalability layer $B(0,0, \ldots)$, while certain others may be dropped entirely. Furthermore, depending on the media, if one component is included or excluded, certain other(s) must be included or excluded as well. Information at the component level may be conveyed in terms of a Component Dependency Matrix.

FIG. 4B shows an example of a matrix D. If there are M components in a media parcel, the component dependency rules may be specified in terms of an M×M matrix D. The diagonal elements $d_{ii}$ can be binary and specify whether the ith component must be included, even though this may be the lowest layer after transcoding. $d_{ii}=1$ indicates that the ith component must be included, while $d_{ii}=0$ indicates that the ith component may be dropped if needed. Non-diagonal elements $d_{ij}$, $i \neq j$, are 5-ary and specify whether the jth component can be included or excluded if the ith component is included or excluded. $d_{ij}=0$ indicates that no dependencies exist between the ith component and the jth component. $d_{ij}=1$ indicates that if the ith component is included, the jth component can also be included. $d_{ij}=2$ indicates that if the ith component is included, the jth component can be excluded. $d_{ij}=3$ indicates that if the ith component is excluded, the jth component must be included. $d_{ij}=4$ indicates that if the ith component is excluded, the jth component can also be excluded.

FIG. 4A also shows a media description TYPE field which can be one of three types, defined by the value of the Type field. Type=I (Integrated) indicates an integrated parcel with media descriptions and data. FIG. 5A shows the Type=I format. FIG. 5B shows a Type=D (Data only) format which indicates a parcel with no descriptions only data. FIG. 5C shows a Type=H (Header only) format which indicates a parcel with only descriptions and no data.

The signature field, denoted SIG. in FIGS. 5A-5C, uniquely identifies the parcel class (type) and follows the type field. The transcoder stores all the header information as well as the layer drop decisions made for a parcel for future reference in its internal memory, indexed by signature. Once a signature has been registered in the transcoder, Type D parcels can be sent, in which case, the media description (header information) corresponding to the signature in the parcel may be looked up in the transcoder's internal memory. The description and decision information stored for each signature may be updated every time a new parcel with the same signature (class) is routed. For Type I and H parcels, the new media description in the current parcel replaces the transcoder's internal stored description, while for Type I and D parcels, the transcoding decisions made for the current parcel may replace the transcoder's internal stored decision for the class. The stored information enables use of Type D parcels, as well as allows maintaining consistency of transcoding, described below.

For a Type I or H parcel with header data, the signature field in the parcel header may be followed by a specification of the number of media components, followed by dependency data for the components referred to as Component Dependency, followed by the list of individual media component headers each in the format shown in FIG. 3B. For a Type I parcel, this parcel header may be followed by the list of the actual coded scalable data for the components each in the meta-bitstream-format of FIG. 2A. For a Type H parcel, the parcel ends at the end of the header. For a Type D parcel, no headers typically exist, but a Type D parcel only contains the list of scalable data components each in the format of FIG. 2A.

The network may obtain attribute values for the overall parcel given the attributes and the associated values for individual components. The attribute list for the overall parcel contains the union of all the attributes specified for all components. When the same attribute occurs in one or more components, the combination type defined in the Attribute_Combination field of Attribute_code ("COMBINE" field in FIG. 3B) determines the overall value. For example, if Attribute_combination is "additive," the overall attribute value is the sum of attribute values of individual components. If Attribute_combination is "maximum," the overall attribute value is the maximum of the attribute values of individual components. The network uses the overall attribute values of the transcoded parcel in the transcoding operation to decide which layers from which components to drop in order to satisfy the imposed by the outbound constraints.

Figure 6:
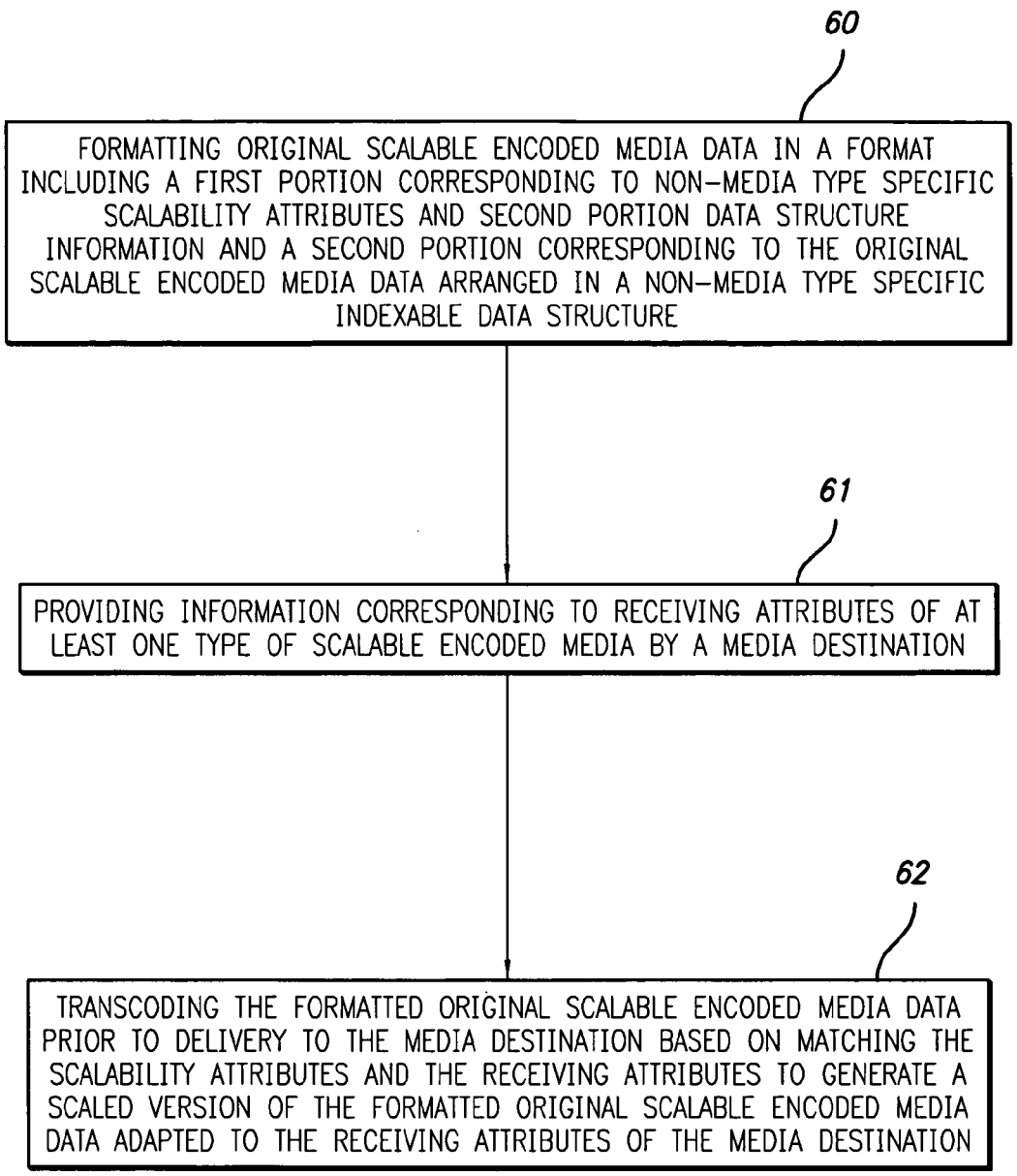
FIG. 6 is an example of a method for scalable encoded media delivery.

FIG. 6 shows a method of delivery of scalable encoded media data. According to this design, original scalable encoded media data is formatted in a format that includes first and second portions as shown in FIG. 1. Specifically, the network formats the media data (60) to include a first portion corresponding to non-media type scalability attributes and second portion data structure information and a second portion corresponding to the original scalable encoded media data arranged in a non-media type specific indexable data structure (FIGS. 2A and 2B). In addition, information corresponding to receiving attributes of a media destination of any type of scalable encoded media is provided (61). The formatted original scalable encoded media data is then transcoded prior to delivery to the media destination based on matching the scalability attributes and the receiving attributes to generate a scaled version of the formatted original scalable encoded media data adapted to the receiving attributes of the media destination (62).

Receiving attributes (also referred to as Outbound Constraints) of the receiving destination and any intermediate link may be standardized (similar to the scalability attributes included within the non-media type specific format) so that they can be conveyed to a transcoder unambiguously to enable comparison between the scalability attributes and the receiving attributes. The specifications of the receiving attributes may be based on constraints on definable multivariate functions called measures of the attributes. Definable measures are essentially linear combinations of products of simple univariate functions of attribute values, and alternately may comprise stack functions. According to one example of multivariate functions, the following may be defined: (i) the number of product terms N in the combination, (ii) the number of elements $n_i$ in each product term, (iii) the attribute codes for the attributes $a_{ij}$ in each product term, (iv) the function codes for certain simple univariate functions $f_{ij}(.)$ on the attribute values, and (v) multipliers $\lambda_i$ for the linear combination. Given the defined parameters of the functions, the measure can be expressed as:

$$\sum_{i=1}^{N} \lambda_i \prod_{j=1}^{n_i} f_{ij}(a_{ij}) \quad (1)$$

where $f_{ij}(x)$ are simple univariate functions such as $x$, $x^2$, $x^{-1}$, $\log(x)$, $e^x$, etc., codes corresponding to which are to be included in the standard specification.

Constraints may next be imposed on the above-defined measures. Constraints can either be limit constraints or optimization constraints. Limit constraints are outbound constraints typically including specific limiting values for attribute measures. Limit constraints may be specified as maximum and/or minimum supportable values for the receiving destination for the measure. When both the maximum and the minimum are specified for an attribute measure we have a range of supportable values for it. For instance, an example of a limit constraint is size/latency is less than 300 Kb/s. Here size is an attribute, but 1/latency is specified in outbound constraints as a multiplier, indicating a bandwidth restriction on received media by the receiving destination. Another example would be display resolution being less than 800 diagonal pixels.

Optimization constraints specify limitations in terms of a requested minimization or maximization of attribute measures. The description may include desirability of, for example, minimization or maximization of the measure. One example of such a constraint occurs in rate-distortion optimization, where a measure such as mean_squared_error+$\lambda$ size may be minimized. Here the size attribute corresponds to rate (R), while the mean_squared_error attribute corresponds to distortion (D).

In general, transcoding (62, FIG. 6) can be implemented as simple truncation of bitstream subsets, repacking the bitstream and updating the TOCs appropriately, dependent on the comparison of scalability and receiving attributes. Transcoding does not require decoding or decrypting content in order to transcode due to the arrangement of the scalable encoded media data into the non-media type specific data structure. The network may drop subsets from the outer end in each tier (FIG. 2A). Referring to the alternate representation shown in FIG. 2B, outer rows and columns may be dropped.

Figure 7:
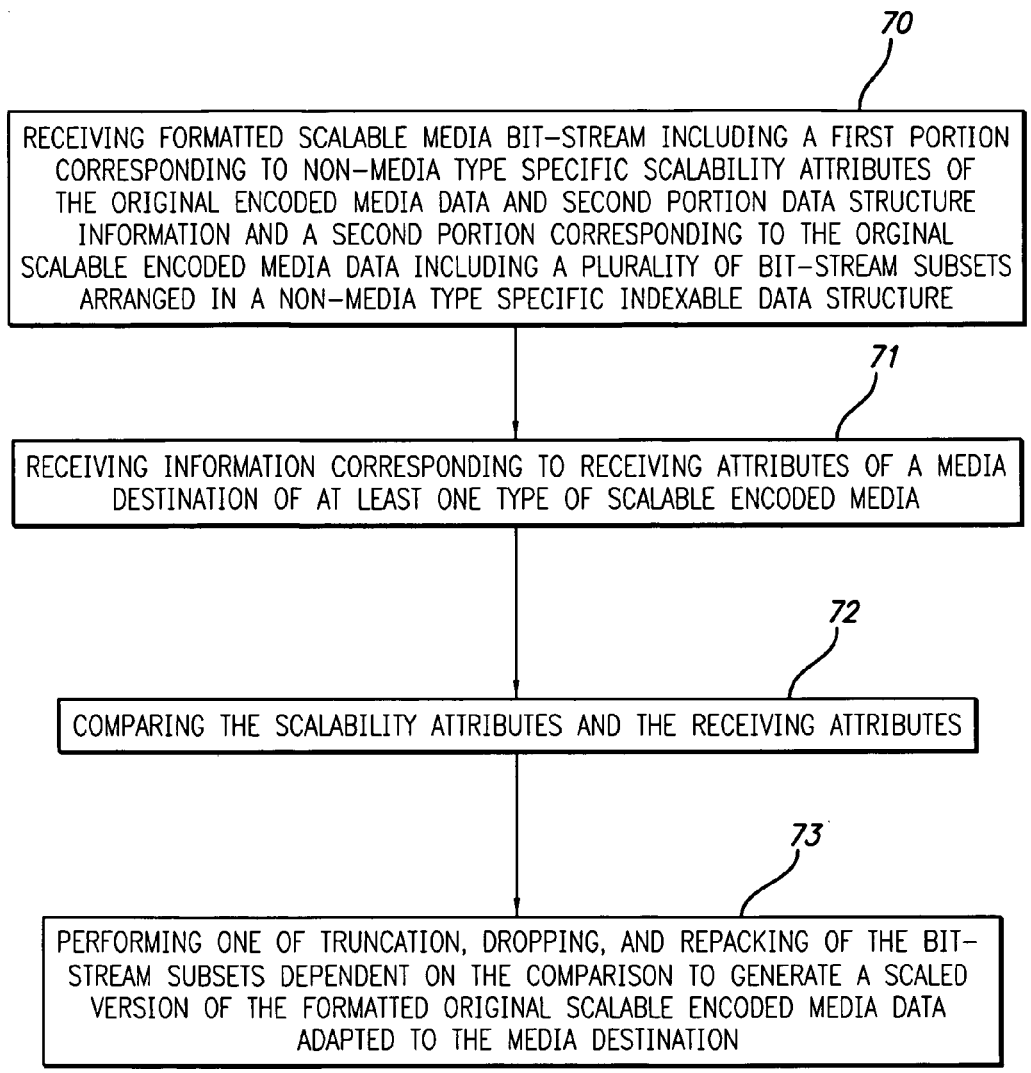
FIG. 7 illustrates an example of a method of transcoding.

Transcoding may be performed according to the method shown in FIG. 7. As shown, the network receives media data in the format including first and second portions (70) as described above, as well as receiving attributes (71). The network compares (72) scalability attributes and the receiving attributes, and the network may perform truncation, dropping, or repacking of the bitstream subsets, depending on the comparison to generate a scaled version of the formatted original scalable encoded media data adapted to the media destination.

Alternately, the network may compare each receiving attribute measure to the formatted media data first portion (e.g., the media component description) to determine the presence of a corresponding scalability attribute. If one of the attributes does not occur in the descriptions of any of the media components, the network may discard the receiving attribute measure as invalid, as no transcoding using this attribute is possible.

For each valid receiving attribute measure (i.e., having a matching scalability attribute within the first portion of the formatted media data) specified with a limit constraint, the network compares a full measure value of the overall packet against the limit constraint to see if the value falls within the range of the limit constraint. The full measure value of the formatted media data may be derived from full attribute values for the formatted media data, which in turn are obtained by combining attributes for media components using the Attribute_combination type field of the Attribute_code (FIG. 3B). If none of the full measure values exceed the range of the outbound limit constraints, no transcoding is performed and the formatted media data. is forwarded or transmitted. If at least one of the full measures is out of range of the limit constraints, the network performs transcoding such that subsets (i.e., outer rows or columns as shown in FIG. 2B) from one or more media components are addressed by truncation, removal and repacking.

Determination of which row or column to drop from which components can be implemented in a variety of ways, ranging from simplistic approaches to approaches involving complex optimizations. For example, if the Attribute_Monotone_Type field included in the component headers indicates the attribute is monotonic (non-decreasing or non-increasing), the network may employ the simple approach of dropping rows or columns. Alternatively, complex relationships between components can be developed in order to determined which subsets to drop.

The optimization constraints within the receiving attributes, if specified, are a lower priority than limit constraints. Among choices that do not violate the limit constraints, the transcoder chooses the attribute that maximizes or minimizes the measure value. The network may select optimum layers based on a rate-distortion criterion (i.e. the traditional D+$\lambda$R), or based on a user's relative preferences of one attribute over the other.

Enhanced Transcoding

In one implementation, once the network has selected subsets to drop from specific components, the transcoder or adaptation engine drops the subsets in the bitstream, updates the appropriate TOCs, and truncates the attribute distribution matrixes based on each dropped subset, before sending out the transcoded media data. If the data is of multi-version type and the transcoder represents the final component in the chain before the media data reaches the receiving destination. The transcoding operation comprises extracting only the desired data, and discarding the rest.

The terms "transcoder," "adaptation engine," and "transcoder/adaptation engine" will be used interchangeably herein and are intended to mean a device having the ability to perform adaptation and/or transcoding according to the design presented herein.

In the case where multiple packets are bound for the same receiving destination, providing media descriptions in each packet may not be practical, and the transcoder may drop layers as appropriate. For example, if a consumer receives one presentation slide at a different resolution than the next, the media experience would be diminished. Hence a common media description may be used for a class of packets, typically of the same type. During transcoding, the media description data may be stored in addition to the transcoding decisions for each registered class indexed by an identifying signature (SIG. field, FIG. 4A). If formatted media data containing description data is received (Type I or a Type H packet, FIGS. 5A-5C) for a class for the first time, the network creates an entry in a buffer corresponding to the given signature. If the given signature already exists in memory, the network overwrites the signature. If the network sends a Type D packet belonging to the same class, having only the signature in lieu of the media descriptions, the network may check the descriptions, perform layer drop decisions, and store new decisions in memory for the class. If the network sends a Type H packet, the descriptions stored for the class are simply updated. If the network sends a Type I packet, the network updates a packet description in memory corresponding to the given signature. The network then makes layer drop decisions using the new descriptions. Finally, the network stores the new decisions in memory for the class. For Type D and Type I packets of a class, the network stores the decision for future consistency.

Consistency in this context refers to a constraint where the layer drop profile for each component is left unchanged from one packet to the next for the list of tiers mentioned in the consistency list of the component's header (FIG. 3B). The consistency list may contain a subset of all tiers. For the consistent tiers of a component, the number of subsets dropped may be similar to the decision made for the previous packet, stored in memory for the class. This represents an additional constraint that the subset drop decision mechanism can employ. In the decision making phase of transcoding, tiers in the current stored consistency list for a class may be maintained in the same manner as pre-stored decisions for the class. Thus, for a Type I packet, based on the order of operation as previously mentioned, the new consistency list is used in the decision making phase instead of the old one, because the description is updated before the decisions are made, even though the previous formatted media data's decisions are still used as reference.

The consistency mechanism can enhance consistency in delivery of media data belonging to the same class, while still allowing adaptation based on changing descriptions for same type of formatted media data and changing receiving attributes (such as bandwidth), by permitting change in layer drops for tiers not included in the consistency list.

According to the aspect described above, each signature may remain in storage until dropped as a result of nonuse. The network may employ a circular buffer to maintain an ordered list of most recently used signatures. When a certain signature has not been used for an extended period of time, the network can replace the signature with a new signature.

FIG. 8 shows a scalable encoded media data delivery design including a media source 80, a transcoder/adaptation engine 81, and a media destination 82. The media source 80 provides scalable encoded media data 80A in a format including a first portion corresponding at least to non-media type specific scalability attributes of the original encoded media data and data structure information of a second portion and the second portion corresponding to the original scalable encoded media data arranged in a non-media type specific indexable data structure having at least one dimension. The media destination 82 provides information corresponding to receiving attributes 82A of the media destination of at least one type of scalable encoded media. The transcoder/adaptation engine 81 transcodes the formatted original scalable encoded media data prior to delivery to the media destination 82 based on matching the scalability attributes and the receiving attributes to generate a scaled version 81A of the formatted original scalable encoded media data.

In general, the transcoder may be connected directly to the media. In this case, the media destination directly provides (or the transcoder senses) the receiving attributes to the transcoder thereby enabling the transcoder to provide the scaled version of the formatted data. Alternatively, the transcoder may receive or sense aggregated capabilities of all downstream media destinations. Scalable encoded media data may then be delivered to the media destinations based on aggregated capabilities. For instance, FIG. 9 shows a network including a plurality of transcoders each performing transcoding on the formatted media data in accordance with the present invention and dependent on the aggregated receiving attributes of the downstream media destination receiving attributes (white arrows). The single bitstream of formatted media data generated by transcoders 90 and 91 may provide formatted media data that is adapted to the receiving attributes of both of the receiving destinations 93 and 94 and transcoder 92 generates individual formatted media data bitstreams each adapted to the capabilities of one of receiving destinations 93 and 94.

The transcoder can be located within media servers, midstream routers, and/or edge servers and can be implemented in any combination of hardware, software and firmware.

Figure 10:
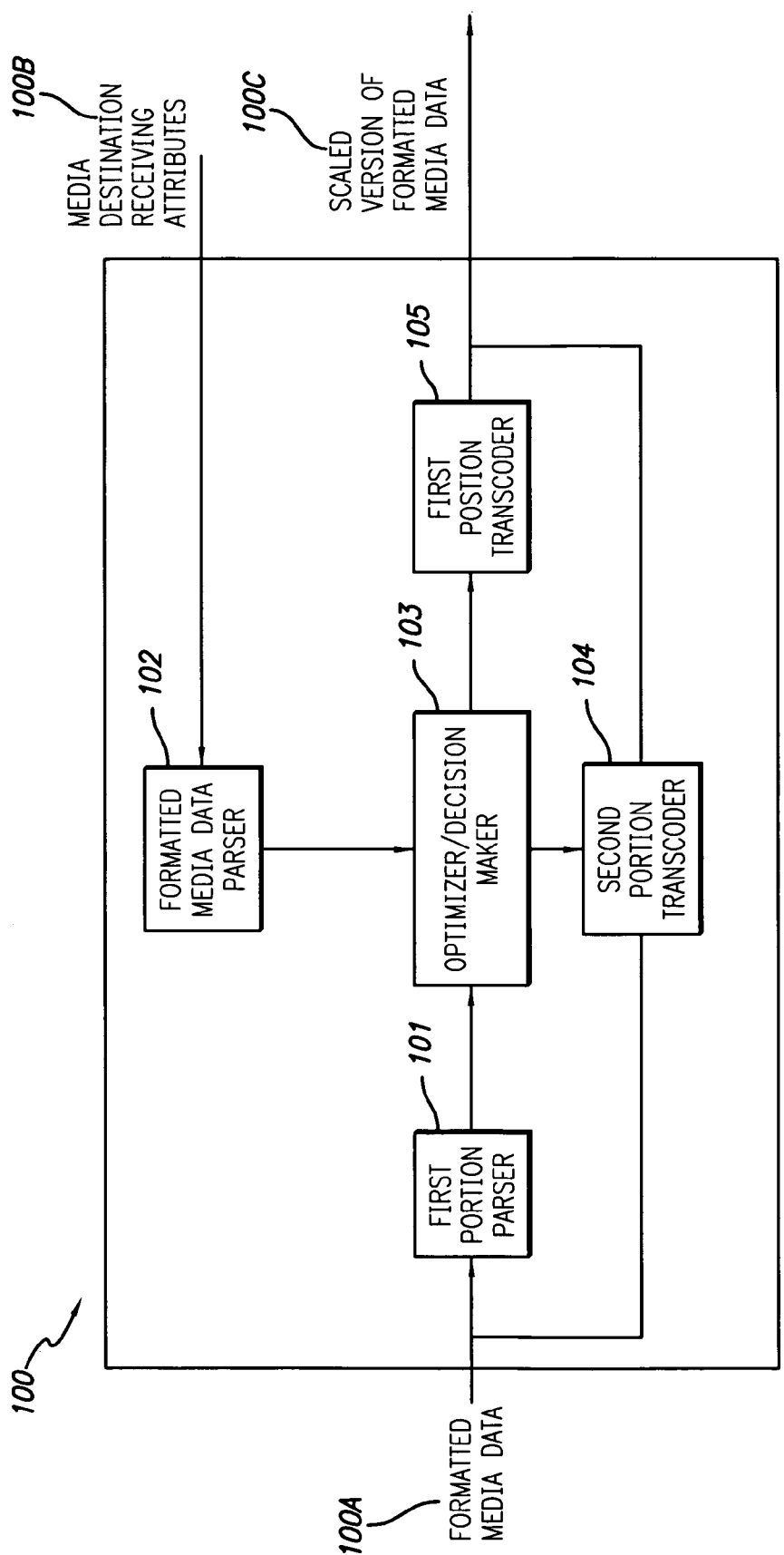
FIG. 10 shows a first embodiment of a transcoder in accordance with the present invention.

FIG. 10 shows one embodiment of a transcoder/adaptation engine 100 able to receive formatted media data 100A and media destination receiving attribtutes 100B and generate a scaled version of the formatted media data 100C. The transcoder/adaptation engine 100 includes a first parser 101 for receiving and parsing the first portion 20 of the formatted media data (FIG. 1). The transcoder further includes a second parser 102 for receiving and parsing the media destintation receiving attributes 100B. Each of the parsers 101 and 102 parse out the desired attribute data and information and provide the desired attribute data to the Optimizer/Decision Maker 103. The transcoder 100 further includes first portion sub-transcoder 104 and second portion sub-transcoder 105. The Optimizer/Decision Maker 103 provides control to both of the sub-transcoders thereby causing the transcoders to transcode (i.e., truncate, remove, repack bitstream subsets) each of the first and second portions of the formatted media data to generate a scaled version of the formatted media data 100C.

Digital Adaptation

Figure 11:
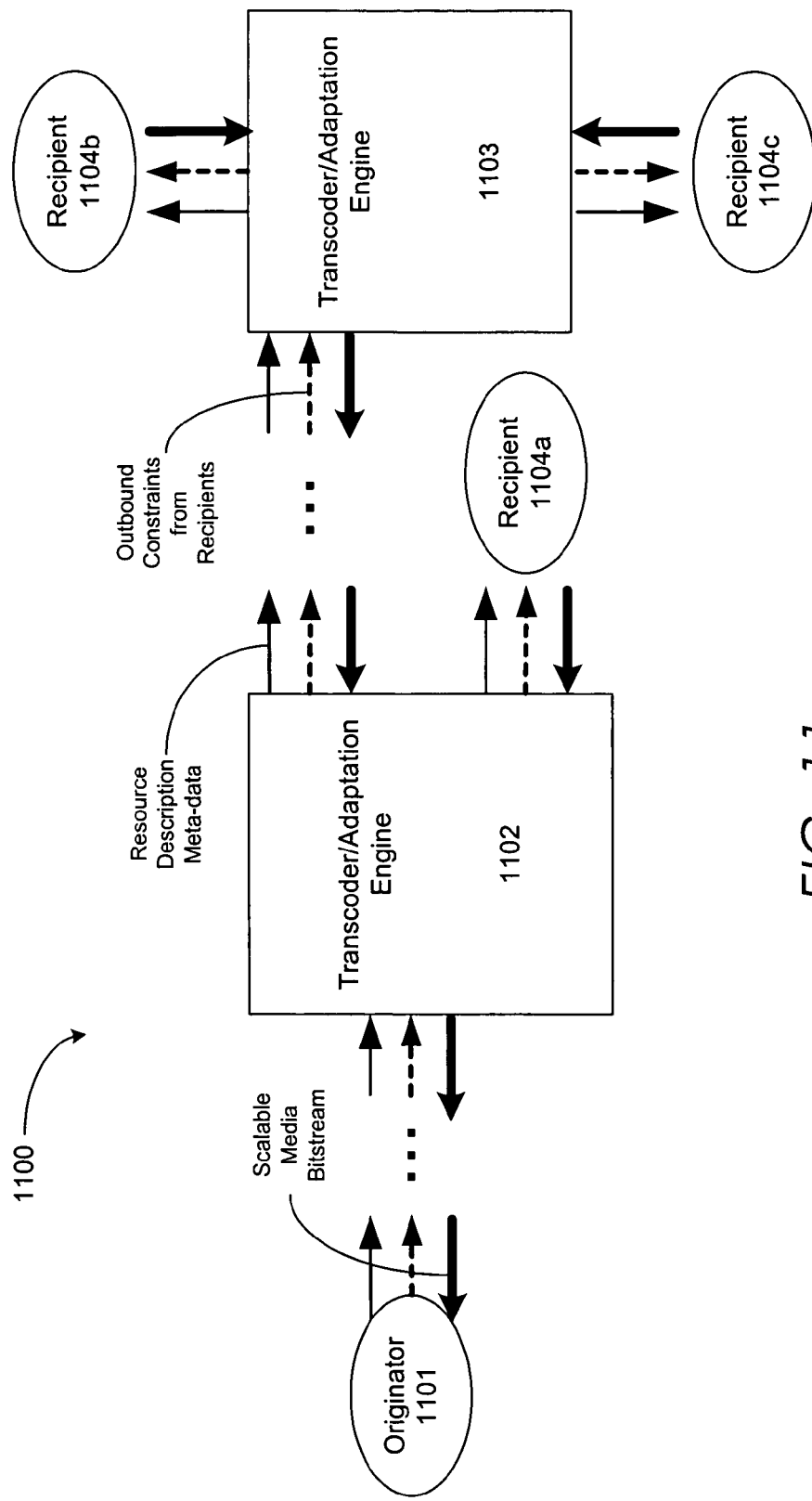
FIG. 11 illustrates an exemplary media type independent adaptation chain including an originator, various transcoders/adaptation engines, and several recipients.

FIG. 11 shows an embodiment of a generic media delivery model 1100, where media data created by the originator 1101 is routed through an arbitrarily long chain of transcoders, such as adaptation engines 1102 and 1103, before reaching an eventual recipient 1104. FIG. 11 therefore represents an alternate conceptual representation of the design presented in FIG. 8. In this view, both the originator 1101 as well as the software or hardware system or network used to experience the media at the recipient end can understand and decode the media-encoding format.

Irrespective of the actual content type and its encoding, the scalable resource bitstream is in the universally compliant format described above, and all intermediate transcoders or adaptation engines can interpret and manipulate data in this format. The engines can receive format compliant scalable content and deliver adapted content over multiple outbound streams. All content after adaptation is also format compliant and can be adapted again at a subsequent stage of delivery.

An adaptation engine also processes a description metadata along with the media bitstream as shown in FIG. 11. Description meta-data contains information usable by each adaptation engine about all possible adaptations. The present design restricts possible adaptation choices and allows a compact representation of this description. The transcoder or adaptation engine, such as adaptation engine 1102, not only adapts the media bitstream but also the description meta-data, so that the network can apply a subsequent stage of adaptation. Information may be conveyed and represented to an adaptation engine in various ways. For example, MPEG-21 DIA typically uses XML. Representing this information in binary form as part of the media bitstream itself is one possible implementation, and may be preferred for some applications based on considerations of compactness and manageability. This information is referred to as resource description metadata.

Each adaptation engine may also have knowledge or information regarding aggregated capabilities and preferences of all eventual recipients connected to each adaptation engine's outbound streams. This information largely originates from the recipients, as shown in FIG. 11. However, parts may be sensed by transcoders themselves, as the information aggregates up the adaptation chain based on the delivery infrastructure involved. For a particular transcoder or adaptation engine with a particular outbound connection at the time of adaptation, this information is referred to as it's the adaptation engine's outbound constraint, which may change dynamically.

Note that while the originator/creator of the media as well as the recipients/consumers of the media must have specific knowledge about the encoding in order to provide an experience for the end-user, the intermediate infrastructure does not need to know what the content is and how it has been encoded in order to adapt appropriately. The adaptation operation is based purely on an interpretation of the resource descriptor metadata and the outbound constraints, and does not depend on the specifics of the actual content. Furthermore, the content itself can be encrypted, and transcoding can still proceed as before in the encrypted domain.

While adaptation engines 1102 and 1103 in FIG. 11 appear as functional blocks, in operation they can be components of media servers from where offline or online content originates, midstream routing servers through which scalable content is transcoded and routed, edge servers that connect directly to eventual recipients, or any combination thereof, as well as any other hardware and/or software capable of performing the recited functionality. Also, the delivery model of FIG. 11 can be as simple as a client-server delivery system where a client requests content from a media server with specified capabilities and preferences, and receives appropriately adapted content directly from the media server. In such an implementation, the functional adaptation engine would be part of the media server itself.

Figure 12:
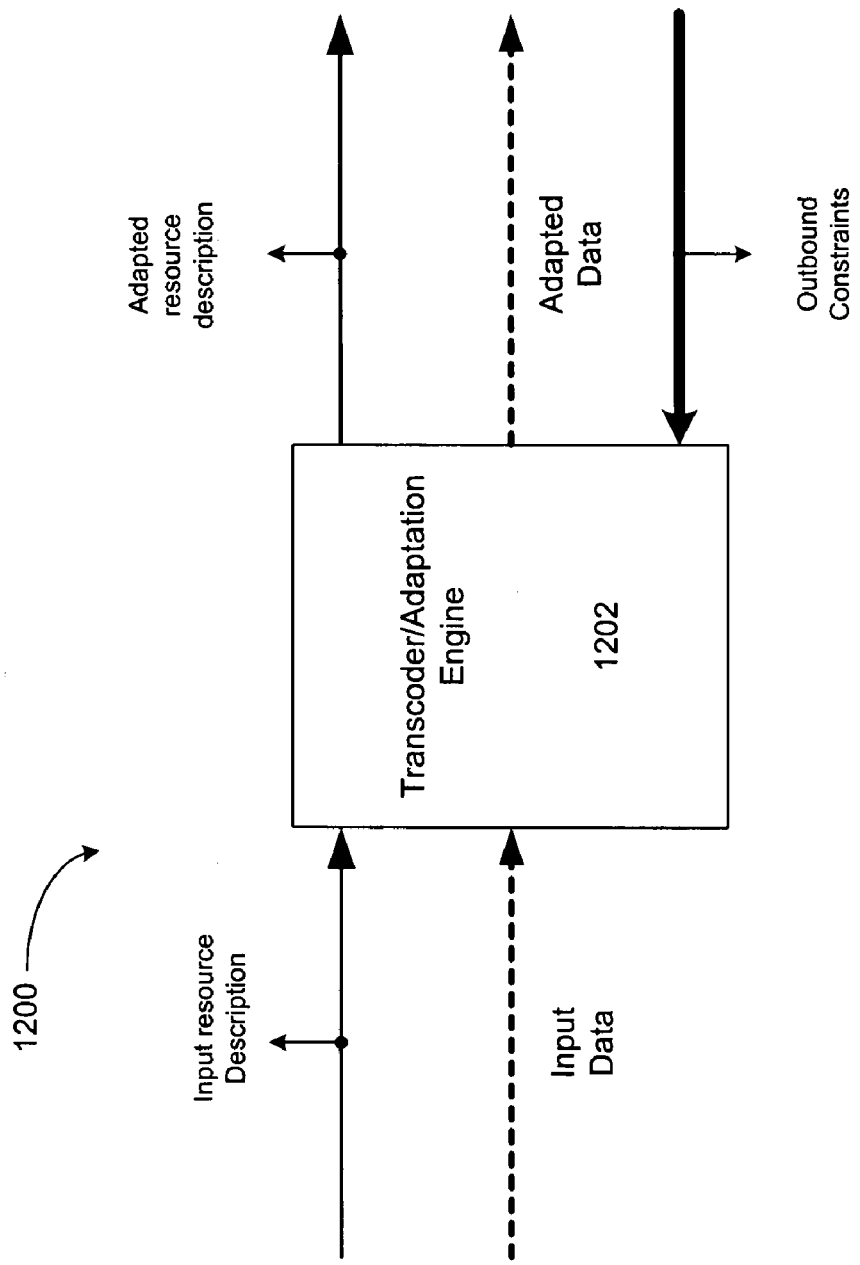
FIG. 12 is an embodiment showing an external model of a transcoder or adaptation engine.

FIG. 12 illustrates an external model of a single input, single output functional transcoder from the end-to-end delivery model. In operation, the adaptation engine 1202 receives a format compliant piece of scalable media. The adaptation engine 1202 must adapt the format compliant piece and forward the piece in a format compliant manner to an eventual consumer, or to another adaptation engine. The adaptation engine 1202 also receives a media description with the bitstream, the media description providing adaptation specifics for the bitstream for various adaptation options, as well as outbound constraints specifying capabilities and preferences of the output connection. Based on the information contained in the input resource description and the outbound constraints, the adaptation engine makes certain adaptation decisions, performs the adaptation operation based on the decisions to the input format compliant stream to deliver format compliant adapted content to its outbound connection, and updates the adapted resource description for use in a subsequent adaptation stage.

Figure 13:
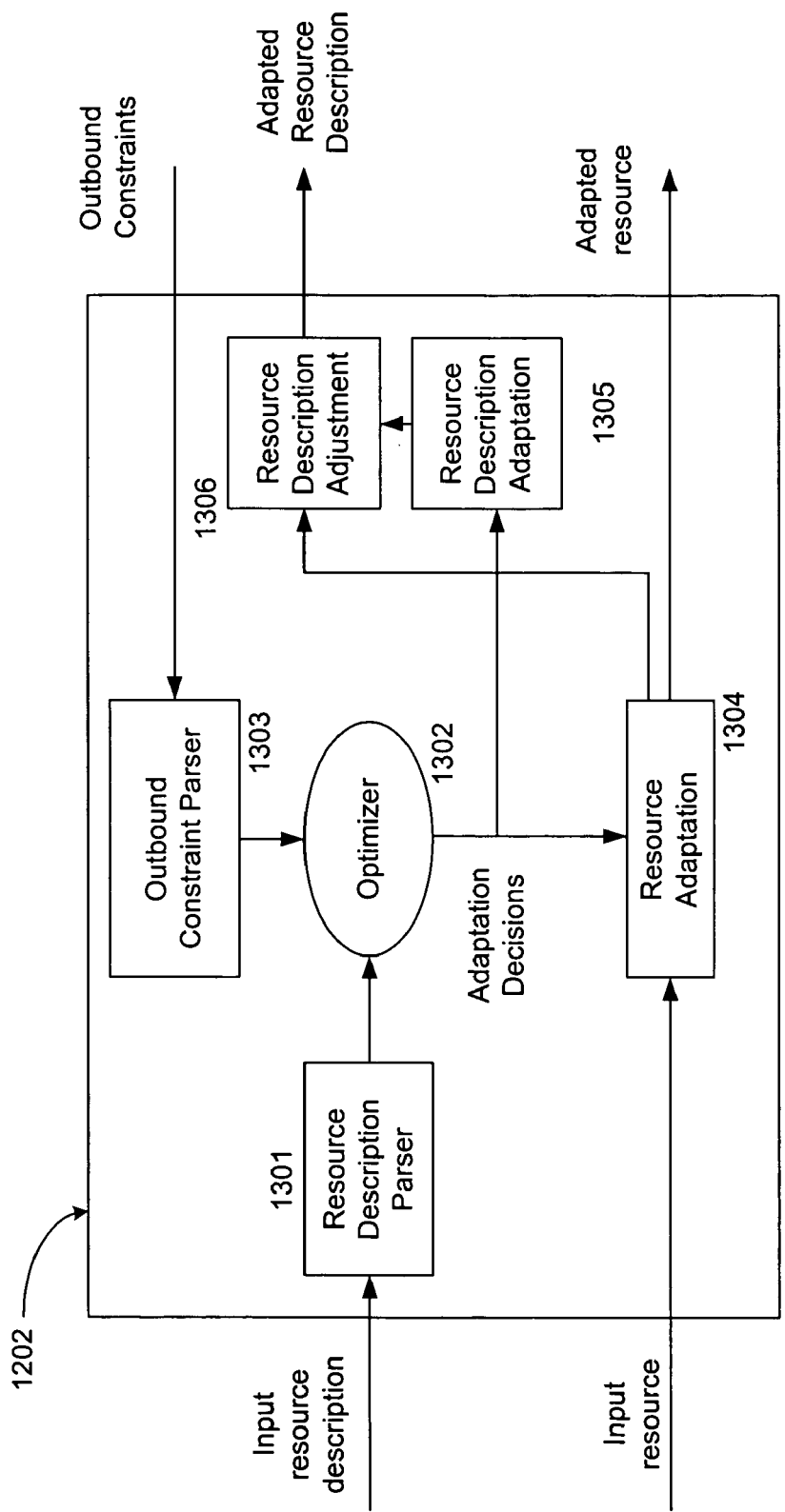
FIG. 13 is an exemplary embodiment showing a transcoder/adaptation engine internal model.

FIG. 13 shows an adaptation engine or transcoder internal model, including further elements of the adaptation engine 1202 beyond those shown in FIG. 12. From FIG. 13, the input resource description is received by the input resource description parser 1301, which parses the input resource description and passes it to the optimizer 1302. Optimizer 1302 decides on transcoding options. The outbound constraint parser 1303 receives the outbound constraints, and parses and passes the outbound constraints to the optimizer 1302. The optimizer 1302 passes adaptation decisions to the resource description adaptation engine 1305, which modifies the resource description based on decisions made by optimizer 1302. Resource description adaptation engine 1305 also passes data to the Resource description adjuster 1306, which also receives data from the resource adaptation engine 1304. Resource description adjuster 1306 produces the adapted resource description. Adaptation decisions are also provided from the optimizer 1302 to the resource adaptation engine 1304, which receives the input resource, adapts the resource based on adaptation decisions made by optimizer 1302, and provides the adapted resource.

The formatting framework presented herein does not determine the operation of the optimizer module in the transcoder or adaptation engine. The adaptation engine arrives at relatively optimal adaptation decisions based on the resource description and outbound constraints for a particular implementation.

In an actual delivery scenario, content may need to be packetized and transmitted. In this regard, among various design choices, there are two that are of particular interest, one based on interpretation of the foregoing format as a file format, and another based on interpretation of the foregoing format as a packet format.

In the file format usage case, the scalable resource can be significantly larger than a typical network packet. Either the transcoder or adaptation engine adapts an entire format file in one pass before network packetization and transmission, or adaptation occurs downstream, possibly in multiple stages. In the latter case, the entire format compliant resource does not need to be available at the transcoder or adaptation engine before the adaptation operation can commence. The resource description and the outbound constraint specifications are used by the adaptation engine to adapt the media content. As long as the adaptation engine receives the meta-data in full, the scalable bitstream resource in FIG. 13 may arrive in stages in multiple network packets, and the bitstream can be either forwarded, dropped, or partially dropped by the engine as they arrive, based on the adaptation decisions already made. Thus, the same adaptation model can be used for both files transcoded in one pass as well as for a streamed file.

In the packet-format case, the entire format compliant content comprises one packet, which can be adapted by a midstream transcoder or adaptation engine and transmitted. The resource description may be included as part of the packet, using a form of binary encoding rather than a language such as XML.

Regarding use of a particular language or particular languages, it is to be understood that the current embodiments are directed toward XML, the Extensible Markup Language.

Other languages, including but not limited to other markup languages, may be employed while still within the scope of the present design.

Figure 14:
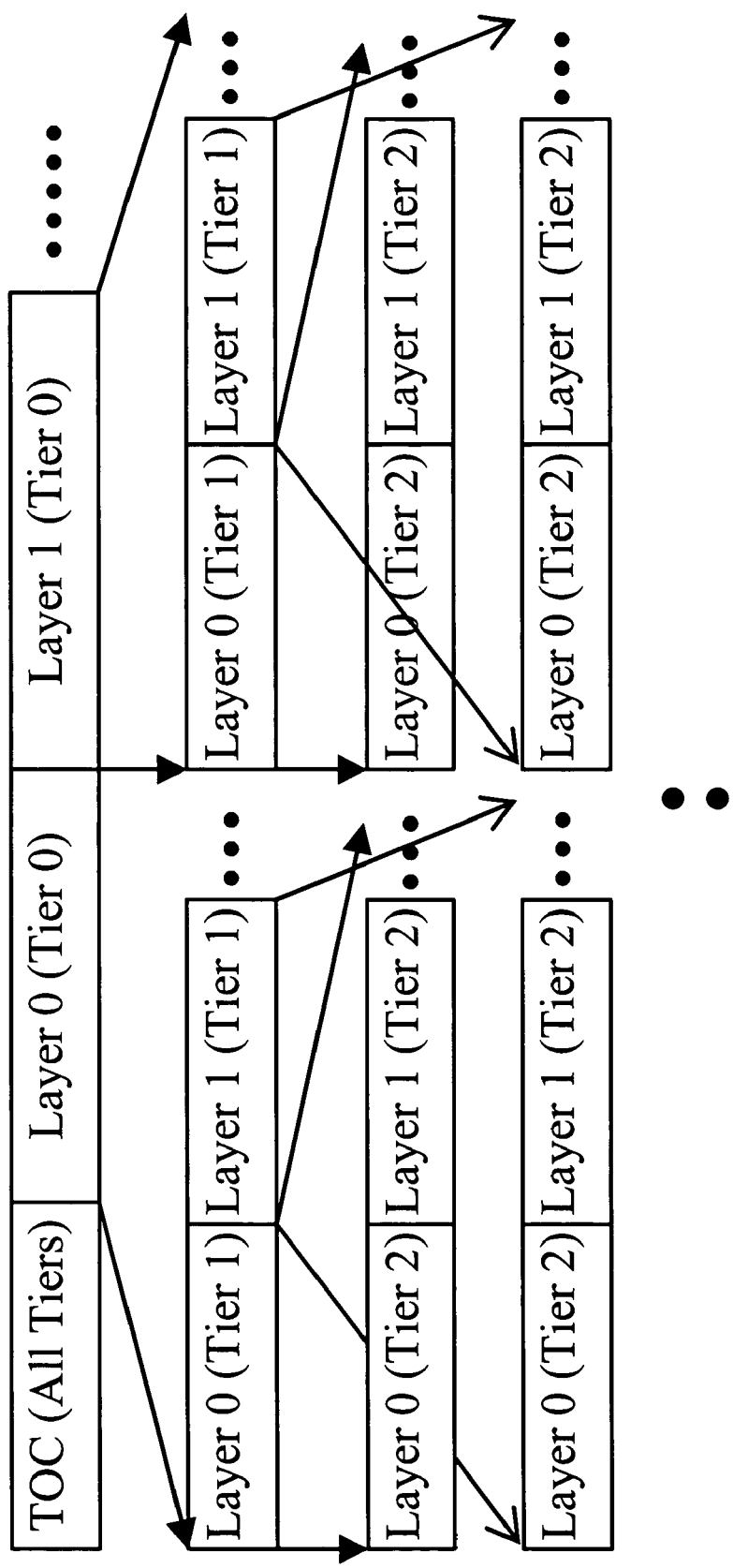
FIG. 14 illustrates examples of meta formats with nested scalability.

FIG. 2B shows an alternate representation of the multi-tiered scalable encoded bitstream of FIG. 2A including a plurality of bitstream subsets B(x,y,z) arranged in a cube where each of the dimensions of the cube correspond to each tier of FIG. 2A. Each of the three dimensional blocks in the cube of FIG. 2B is called an "atom." For the cube shown in FIG. 2B, a given attribute can either decrease or increase along the dimension. For example, if tier 1 corresponds to resolution, then resolution increases along the x dimension. In this representation, transcoding can be implemented by dropping layers and updating the TOCs. In other words, transcoding or scaling of the encoded bitstream can be achieved by truncating rows or columns of the cube of FIG. 2B. For instance, if tier 1 corresponds to resolution, tier 2 corresponds to SNR, and tier 3 corresponds to interactivity, then if the network truncates subsets 10, the encoded bitstream may be scaled such that SNR increases, but resolution and interactivity are not scaled. Causality may be maintained during encoding and encryption of media data The format framework presented above is based on scalable bitstream components inherently containing logical nested tiers of scalability, as shown in FIG. 14. Using zero-based indexing, the bitstream is first divided logically into multiple layers of tier 0 scalability. Tier 0 may be any one of resolution, temporal, SNR and so on. Each data segment in each tier 0 layer may further be divided into layers of tier 1 scalability, and so on. Tier 1 may also have different meanings based on the actual media content. Further tiers operate in the same manner.

One example of this layering is a JPEG2000 bitstream, which can be readily cast into this logical-bitstream-format. In one of the scalability progression modes in JPEG2000, RLCP, the highest tier is resolution scalability, and nested SNR scalable layers reside within the resolution scalable layers. In an alternative scalability progression mode, LRCP, the highest tier is SNR, and nested resolution layers reside within SNR layers. Multi-tier nested scalability structure is common in both RLCP and LRCP.

This logical meta-format is analogous to that of a book, where nested layers exist for chapters, sections, sub-sections and so on. The "book" format can be common across all books irrespective of content. Likewise, all scalable bitstream representations can be cast into a common nested scalability structure that can be standardized into a bitstream format, irrespective of content.

The above nested structure is logical in the sense that the actual bitstream provides more freedom for data segment location. Normally, the layers at the deepest tier, or atoms, form a single contiguous segment of the bitstream that can be dropped as part of an adaptation process. Arbitrary filler code may also exist between atoms.

Figure 15:
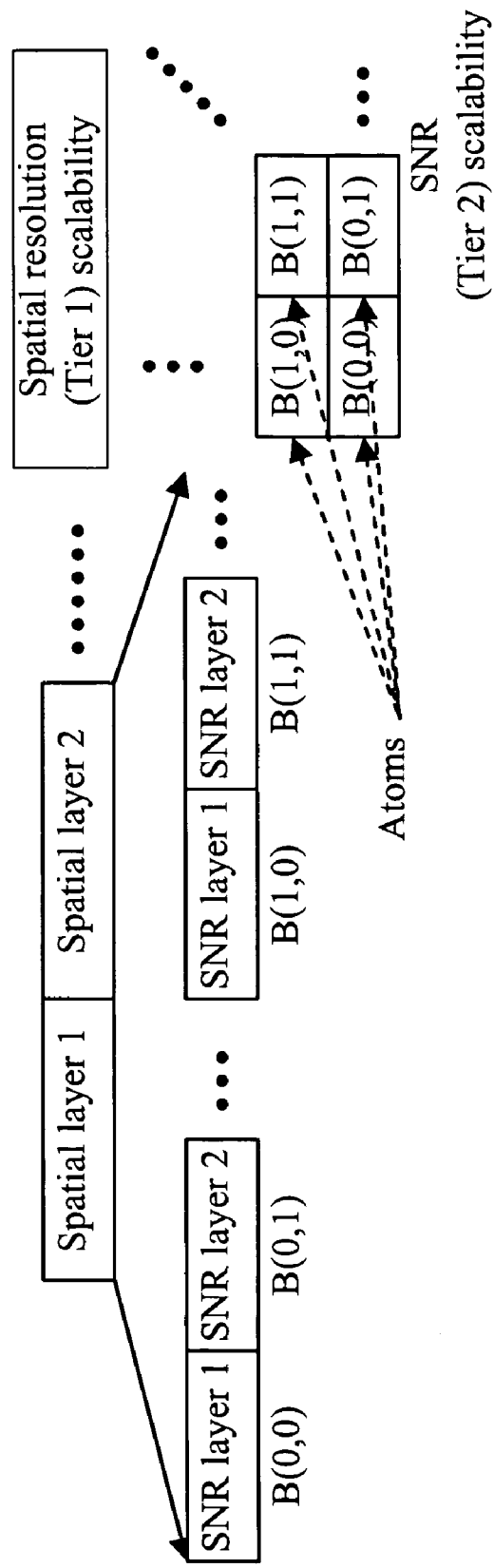
FIG. 15 is an example of a JPEG 2000 sample bitstream.

As an example, the first two tiers of JPEG2000 RLCP progression mode can be organized in a two dimensional cube (L=2) as shown in FIG. 15. The network can obtain the bulk of the bitstream apart from any filler code by scanning the atoms in the data cube in some order. The same concept generalizes readily to more than two dimensions or nested tiers, such as the three dimensional cube of FIG. 2B.

Each tier in the meta-bitstream format can be either incremental or exclusive in terms of scalability. The header contains a flag for each tier to denote whether the layer is multi-version or incremental. If all tiers are exclusive, the bitstream is fully multi-version where each atom is an independent version. If all tiers are incremental, the bitstream is truly scalable, such as in JPEG2000. Tiers may be mixed between incremental and exclusive scalability. Exclusive tiers may be regarded as a special case of incremental tiers, but transcoding may not be efficient unless this distinction is made apparent to a transcoder in the header information.

The multi-tier format allows multiple dimensions of scalability to co-exist in a bitstream and enables a simplified form of adaptation. In particular, with a scalable bitstream conformant with the format, any adaptation is simply implemented as dropping atoms, repacking the bitstream, updating any TOCs, and performing other minor editing operations, while preserving the generic multi-tier structure for re-transcoding. For incremental tiers, the network can only drop layers from the outer end. For exclusive tiers, the network can drop all but one layer.

If L tiers exist in a format component, then an "adaptation point" is denoted by the L-tuple $(d_0, d_1, \ldots, d_{L-1})$, where $d_i$ indicates to a decoder either $d_i$ layers from the beginning are included in the ith tier if the ith tier is incremental, or only the $d_i^{th}$ layer is included if the ith tier is exclusive. The adapted subset bit stream that reaches the decoder may be indicated by some form of concatenation of the atoms $B(j_0, j_1, \ldots, j_{L-1})$, where for tier $i=0,1, \ldots, L-1$ either $j_i=0,1, \ldots, d_i-1$ for incremental tier i, or $j_i=d_i-1$ for exclusive tier i. If the transmitted data stream is non-null, at least one layer is typically transmitted in all tiers. In other words, all non-empty adapted bitstreams must contain at least one of the atoms $B(z_0, z_1, \ldots, z_{L-1})$, where $z_i=0$ for incremental tier i.

Using the data cube concept, dropping layers from the end in an incremental tier is equivalent to chopping off the ends of the data cube in units of layers. Selecting a particular layer from an exclusive tier is equivalent to extracting a slice from the data cube. The network generally transmits a cube reduced from the original after the adaptation process. Examples for the case of two nested tiers are shown in FIGS. 16 and 17. From FIG. 16, the original bitstream contained six layers of tier 1 incremental scalability nested with four layers of tier 2 incremetal scalability. Adaptation drops one tier 2 layer and two tier 1 layers, and the shaded atoms make up the adapted bitstream. From FIG. 17, the original bitstream contained six layers of tier 1 exclusive scalability nested with four layers of tier 2 incremetal scalability. Adaptation drops one tier 2 layer and selects the fourth tier 1 layer, and the shaded atoms make up the adapted bitstream.

Because adaptation can be implemented as simple dropping of layers, a transcoder or adaptation engine does not need to decode or decrypt content in order to perform adaptation. However, an encoder or an encrypter maintains causality of the data atoms so that a decoder or decrypter can accept adapted content. In general, no dependencies occur across layers in excusive tiers, and dependency across layers in incremental tiers is limited to being causal.

The causality constraint for encoding provides that for encoding data atom $B(j_0, j_i, \ldots, j_{L-1})$, the encoder uses information from atoms $B(k_0, k_1, \ldots, k_{L-1})$, where for $k_i \leq j_i$ and at least one $k_i \neq j_i$ for incremental tiers i, and $k_i = j_i$ for exclusive tiers i, where $0 \leq j_i, k_i \leq l_i-1$. Thus for most adaptations, the decoder at the receiving end is able to unambiguously decode content.

The causality constraint for encryption implies that derivation of the starting state of the encryption engine for atom $B(j_0, j_1, \ldots, j_{L-1})$ occurs based on the ending states of the encrypter for adjacent causal atoms of incremental tiers $B(k_0, k_1, \ldots, k_{L-1})$, where $0 \leq j_i-k_i \leq 1$ at least one $k_i \neq j_i$ for incremental tiers i, and $k_i = j_i$ for exclusive tiers i, for $0 \leq j_i, k_i \leq l_i-1$.

The foregoing discussion generally addresses a single coded scalable component, where a component is a coded unit of data that may be represented in a scalable logical bitstream format represented graphically by a data cube. However, multiple coded components can exist in a composite bitstream. While different parcels in the same bitstream may be formed by the same components, the encoding structure for each component may vary from parcel to parcel depending on characteristics of the content contained in the parcel.

The present design accommodates the typical streaming scenario where information for each parcel from both the descriptor side and recipient side, as well as the parcel bitstream, comes into the transcoder or adaptation engine sequentially. Alternatively in an interactive application, parcels may be adapted and delivered randomly based on user interaction.

Parcels, components and atoms within a component are essentially logical constructs that may exist anywhere in the bitstream. These constructs exist and are defined, but to make format adaptation viable for a given bitstream, syntactic restrictions are not necessarily imposed on the bitstream based on this hierarchy. An example of a bitstream segment with two parcels, each consisting of two components is shown in FIG. 18.

Figure 18:
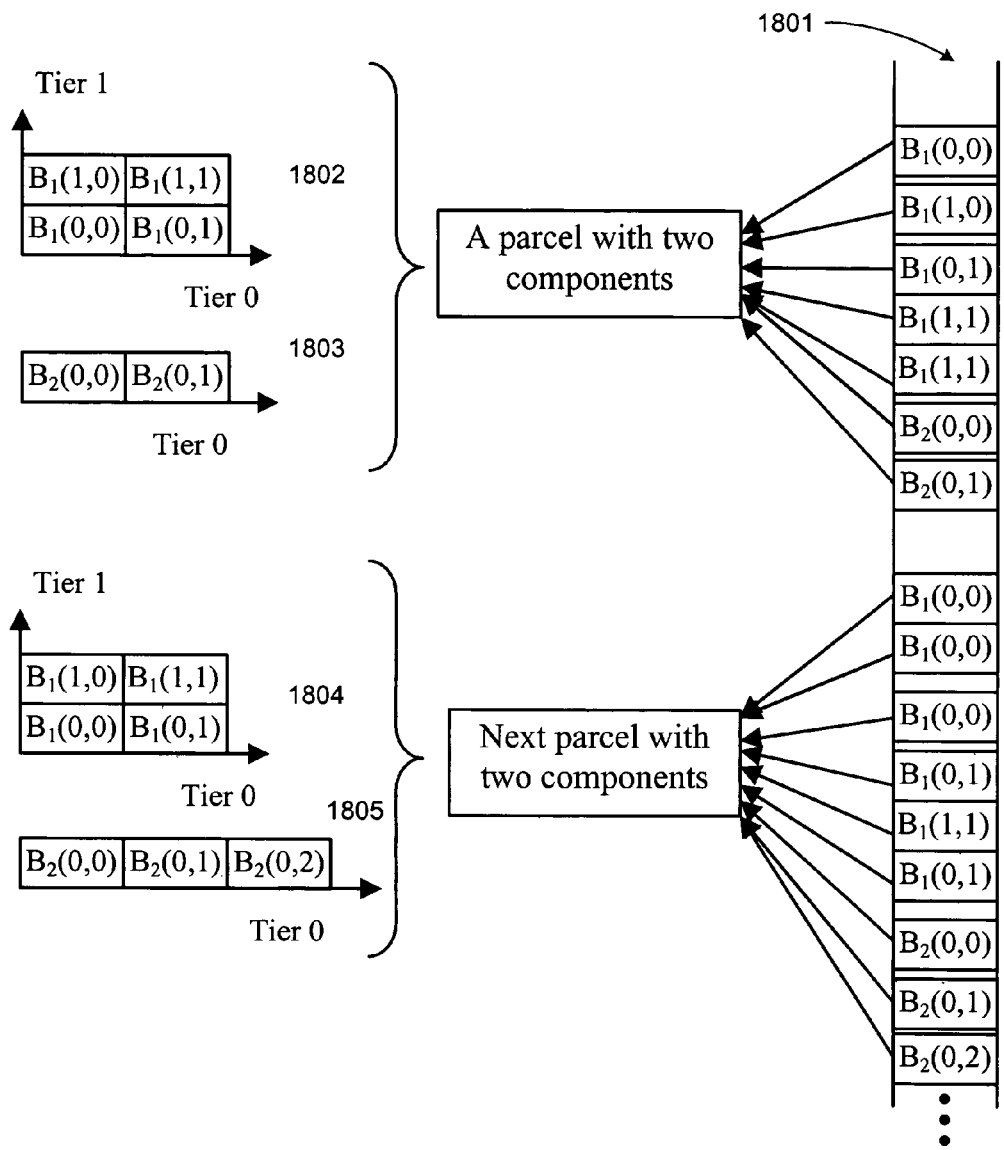
FIG. 18 is a bitstream layout for two parcels each containing two components.

From FIG. 18, bitstream 1801 comprises two parcels each containing two components. The bitstream 1801 is made up of multiple atoms B1 and B2, which when received, are initially placed into a parcel with two components 1802 and 1803. Additional atoms received from the bitsream are placed in the next parcel with two components 1804 and 1805.

The transcoder or adaptation engine must select a logical or appropriate adaptation point for performing adaptation without information of the specifics of the media and the coding. A transcoder or adaptation engine may have information regarding certain relevant scalability properties of a formatted resource through the resource description. The transcoder or adaptation engine may also have information regarding capabilities and preferences of its outbound connection through the outbound constraint specifications. The relationship between the scalability properties of the resource, on the one hand, and the capabilities and preferences of the transcoder outbound connection, on the other, on both the media creator/originator side and the receiver side of the adaptation engine is established through "adaptation variables". The resource description and the outbound constraints interact using these variables so that the adaptation engine can select omissible layers and match the two sides.

If a receiver has information regarding the structure of the content expected to be received through an adaptation engine, the receiver could exactly specify the requested adaptation point in the engine's outbound constraints specifications. In operation, a receiver expecting, for example, JPEG2000 images may not know the dimensions and encoding parameters for a particular image. The receiver may not have the ability to request a specific adaptation point based on considerations of display resolution, quality, and so on. Thus resource description and outbound constraints may be disassociated from the structure as much as possible, typically by using adaptation variables.

From the foregoing descriptions, adaptation variables are expressed quantitatively in terms of non-negative (floating) numbers, referred to as variable values, defined over the discrete space of all possible adaptation choices. The method used to quantify the variables can be communicated to the developer of the media experiencing system. The transcoder or adaptation engine itself does not need to know the meaning of the variable values. Values may have different interpretations for the media creator, the consumer, and the adaptation engines in between. To the media creator/originator, variable values represent quantified properties for adapting content. To a media consumer, variable values are quantified properties indicating limitations and preferences. To a transcoder/adaptation engine, variable values represent numbers used to decide how to drop layers and adapt an input bitstream.

Feature variables are quantifiable properties relevant to a single media component or set of media components. Features defined for a single component are elemental features, while those defined over more than one component are product features. Examples of elemental feature variables include Codesize, MeanSquaredError, SpatialResolution, TemporalResolution, and so forth. One example of a product feature variable is PerceptualRichness, a product feature of the adaptation points of audio and image components of a parcel that cannot be expressed as a function of individual features from the two components.

Each feature is associated with a name that uniquely identifies the feature within the context of the media parcel being adapted and/or delivered. Thus, the feature names used in the resource description and the outbound constraints for the same parcel of media are typically consistent. Across different media types or parcels, no restriction exists on the names used as no conflict exists when names are resolved at the adaptation engine. The media creator providing the resource description defines features relevant to the media and communicates the unique feature names, meanings, and value spaces to the media experiencing system developer so that the latter can generate meaningful outbound constraints.

The resource description conveys, for each product feature, the quantitative values the product feature would have for all possible joint adaptation points of the format components in the product feature. This set of non-negative values is the product feature distribution. If C components are in the product feature, with $L^c$ nested tiers in the cth component (c=0,1, ..., C-1) $2^C-1$ non-empty distributions may be provided, each corresponding to the case where at least one component is non-empty (included), along with an all empty feature value $C_\phi$ corresponding to the case when all components are empty. Among the non-empty distributions is one corresponding to the case where all components are included. In this all components included case, the distribution specifies a $(L^0+L^1+ \ldots +L^{C-1})$-dimensional matrix with number of elements equal to the product $\Pi$ ($l^c_i$) over c=0,1,..., C-1 and i=0, 1, ..., $L^c-1$, where $l^c_i$ is the number of layers in tier i of component c and $\Pi$ the multiplication function. $2^C-2$ non-empty distributions exist, corresponding to the cases when one or more components, but not all components, are empty. Any such partial empty distribution is specified as a reduced dimensional distribution over the non-empty components. The total number of values typically sent, comprising all the non-empty distributions and the empty value, is the product $\Pi(1+l^c_0 \times l^c_1 \times \ldots \times l^c_{L-1})$ over all c. Each non-empty distribution can be individually specified using a product of marginals as in the elemental feature case.

Components have unique names within the context of a parcel. The media creator conveys feature variables, their meanings and value spaces to the experiencing system developer in addition to component names. Based on the component name, certain variables are defined by default, called "component variables."

The first variable family defined by default is the inclusion indicator. The inclusion indicator has a value of one (1) for all non-empty adaptation points, and zero only if all atoms are dropped. A component is typically included if at least one of its atoms is included. This variable can be used to specify complex constraints based on inclusion or exclusion of whole components. In other words, if a certain component is included, another one is typically included.

A second group of indicators is called "layers in tier indicators." These indicators convey the number of layers in the adaptation point for a specified tier index parameter. Thus if the adaptation point is $(j_0, j_1, \ldots, j_{L-1})$, then the value of this variable corresponding to tier i is $j_i$. A third group of indicators is called the "current number of layers in tier indicators." These indicators convey a constant whose value is the total number of layers currently in the bitstream for a specified tier index parameter. A fourth group is called the "original number of layers in tier indicators," and conveys a constant whose value is the original number of layers in the bitstream for a specified tier index parameter, prior to any adaptation step.

The media creator can also define combination variables in the resource description. Combination variables are mathematical real and/or Boolean expressions and functions involving feature variables, component variables, or other combination variables from a variety of components. Combination variables may be conveyed to the experiencing system developer in the same way as feature variables, and can serve as an alternative for the outbound constraints. Each combination variable may be associated with a certain number of arguments during specification so that the variable can be used as a function rather than as a static expression. One example of combination variables is TotalCodesize, which may be defined as the sum of the Codesize features for individual components in a parcel. Another example, involving the component inclusion indicator variables is a Boolean expression that indicates if component$_1$, is included, component$_2$ must be included (x=>y is equivalent to x'+y). A third example involves taking one argument and computing a polynomial at the value given by the argument.

Combination variables may be identified with a unique name in the same manner as feature variables. The resource description provides a name for each combination variable as the variable is defined.

The mathematical expression for each combination variable is specified in the resource description by means of an ordered list of numeric constants, adaptation variables, arguments and operators that must be pushed into an expression stack for evaluation of the expression. Variables pushed into the stack can be feature variables, component variables or previously defined combination variables, each identified by its unique name. Operators pushed into the stack can include various operands. When a combination variable takes arguments, the definition of the combination includes reference to the arguments of the combination function in order. Arguments can be pushed during specification of a combination variable that takes arguments.

Function and Expression Descriptions and Evaluation

Evaluation of an expression at a transcoder or adaptation engine for a given set of adaptation points corresponding to components of a parcel operates as follows. When the network pushes a constant, the numeric value of the constant is pushed into the stack as a real numeric element. When the network pushes a variable, the network evaluates the numeric value of the variable for the given set of adaptation points, and pushes the variable into the stack as a numeric element. When the network pushes a unary operator into the stack, the current top operator element as well as the next top stack element, which must be a numeric one, are popped out immediately. The operator operates on the numeric operand, and the result is pushed back into the stack as a numeric element. When a binary operand is pushed into the stack, the current top operator element and the two next top stack elements, both of which must be numeric, are popped out immediately. The binary operator operates on the numeric operands, and the result is pushed back into the stack as a numeric element. The same methodology is used for n-ary operators.

When the network calls a combination variable taking arguments, a certain number of elements equal to the number of arguments taken by the function are popped from the stack in order, and the combination is evaluated based on the definition. When all the elements in the expression ordered list has been processed, the topmost stack element yields the value of the expression.

Figure 19:
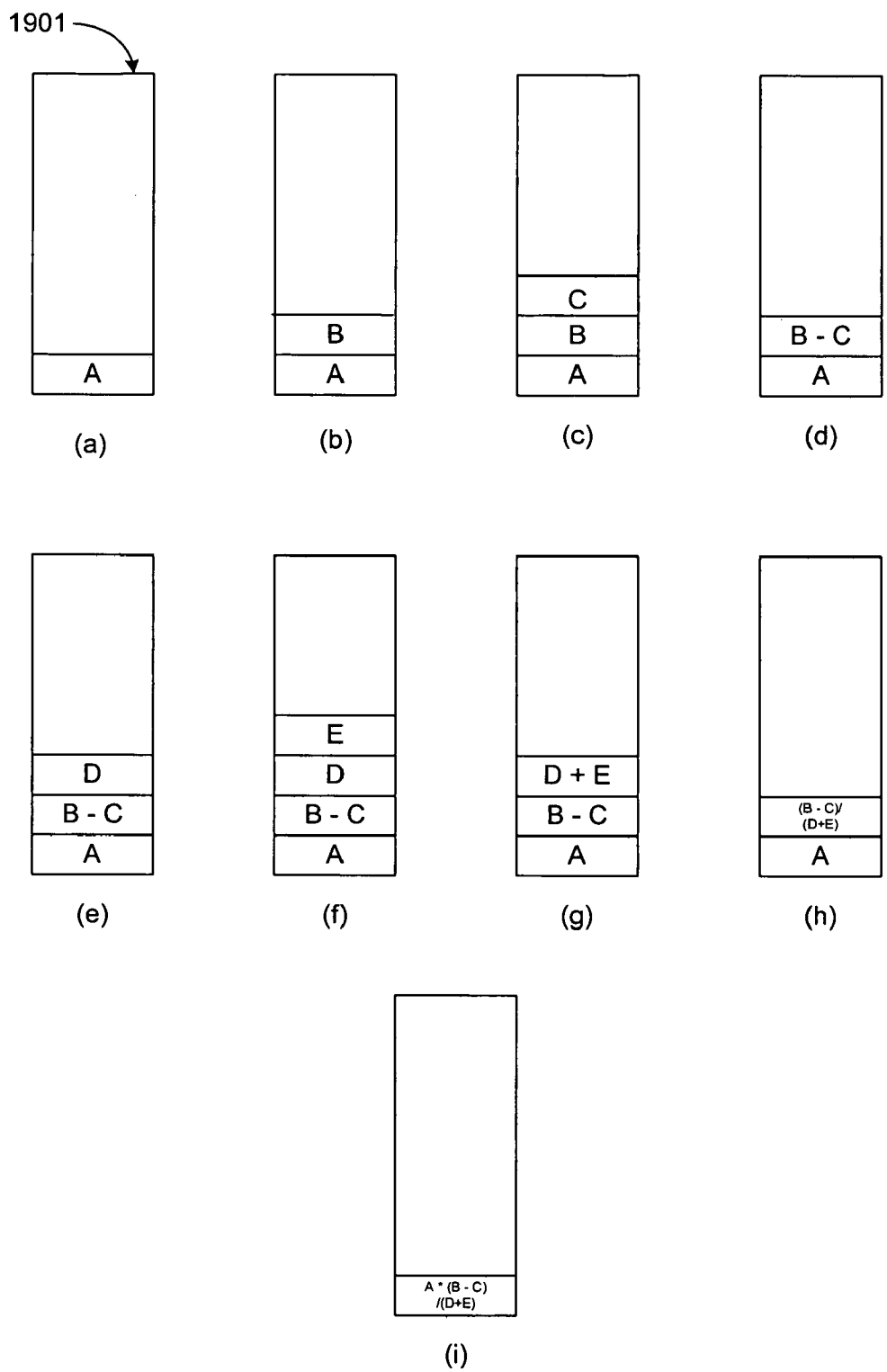
FIG. 19 illustrates evaluation of an expression at a transcoder or adaptation engine.

One embodiment of the foregoing operation is illustrated in FIG. 19. From FIG. 19, the system may break down an expression into components. The expression A*(B−C)/(D+E) may be serialized into A, B, C, "−", D, E, "+", "/", "*". Code for this expression may be execution of this A, B, C, "−", D, E, "+", "/", "*" serialization. The register 1901 loads A in frame (a), loads B in frame (b), loads C in frame (c), performs a subtraction of the top two elements B and C in frame (d), places D in frame (e), places E in frame (f), adds D and E in frame (g), divides (B−C) by (D+E) in frame (h), and multiplies A by (B−C)/(D+E) in frame (i). This yields the value of the expression.

A set of useful real and Boolean operators is allowed for forming expressions. When real and Boolean operators and operands are mixed, the following conventions are used to make the necessary transformations between the two domains: a Boolean 0 has real value 0.0, a Boolean 1 has real value 1.0, any real non-zero value has Boolean value 1. and a real zero 0.0 has Boolean value 0.

The function operationType may be employed, where operationType includes all supported operations. Operands are taken by popping elements from an expression stack. The following operators take one operand v, obtained by popping the stack:

inverse: for value v, the result is 1/v negative: for value v, the result is −v.

magnitude: for a positive value v, v will be returned; for a negative value v, −v will be returned.

log: for a value v, the result is the natural logarithm of v log10: for a value v, the result is the base−10 logarithm of v exp: for a value v, the result is the exponential value $e^v$.

power10: for a value v, the result is 10 raised to the power of v, $10^v$.

sqr: for a value v, the result is $v^2$ sqrt: for a value v, the result is the square root of v.

clampZ: for a positive value v, v will be returned; for a negative value v, 0 will be returned.

boolIsNZ: for a value v, when v is not zero, the result is 1, otherwise the result is 0.

boolIsLEZ: for a value v, when v is less than or equal to zero, the result is 1, otherwise the result is 0.

boolIsGEZ: for a value v, when v is greater than or equal to zero, the result is 1, otherwise the result is 0.

boolNOT: for a value v, when v is zero, the result is 1, otherwise, the result is 0.

The following operators take two operands v0 and v1, obtained by the popping the stack in order:

add: for values v0 and v1, the result is v0+v1 subtract: for values v0 and v1, the result is v0−v1 absdiff: for values v0 and v1, the result is the absolute difference between v0 and v1.

multiply: for values v0 and v1, the result is v0*v1 divide: for values v0 and v1, the result is v0/v1 maximum: for values v0 and v1, the result is the bigger one from v0 and v1.

minimum: for values v0 and v1, the result is the smaller one from v0 and v1.

average: for values v0 and v1, the result is the average between v0 and v1.

boolOR: for values v0 and v1, the result is the logical OR of v0 and v1 boolAND: for values v0 and v1, the result is the logical AND of v0 and v1 boolXOR: for values v0 and v1, the result is the logical exclusive OR of v0 and v1.

The following operators take three operands v0, v1, and v2, obtained by the popping the stack in order:

selector: for values, v0, v1, and v2, if v0 is not zero, the result is v1, otherwise, the result is v2.

An example of the foregoing language and functionality is as follows:

```
<stackFunction name="lagrangian" numArguments="2">
    <variable name="audioDistortion" />
    <variable name="imageDistortion" />
    <argument number="0" />
    <operation operator="multiply" />
    <operation operator="add" />
    <variable name="codesize" />
    < argument number="1" />
    <operation operator="multiply" />
    <operation operator="add" />
</stackFunction>
```

The above example shows that the combination adaptation variable lagrangian uses two arguments. This combination adaptation variable will return the value from the following statement:

$(argument_1*codesize)+\{(argument_0*imageDistortion)+audioDistortion)\}$

Metadata

In a broader view of the present design, the media creator originates metadata, and the metadata contains a full bitstream description enabling an adaptation engine to decide how to drop layers. The metadata specifies the complete hierarchical model of the bitstream with parcels, components, and atoms, and where the atoms lie in the bitstream. For each parcel, metadata defines a set of elemental and product feature variables and specifies their distributions, as well as a set of combination variables that apply locally within the parcel. Metadata also defines global combination variables that apply to all parcels.

Metadata also includes constraints enforced by a transcoder or adaptation engine. Constraints are directives from the content creator to restrain the adaptation choices, and apply either locally to a parcel or globally to all parcels. Constraints specified with respect to metadata are limit constraints. The adaptation engine may combine the constraints specified by the content creator in the resource description metadata with those specified by the receiver in the outbound constraints specifications to obtain the full set of constraints satisfied by an adaptation point.

The resource description metadata contains information pertinent to editing the resource bitstream based on adaptation decisions made for each parcel. For example, information may be modified in the bitstream after adaptation, such as the number of layers included. Metadata specifies, for each parcel, the location in the bitstream where a certain number of bits may be replaced after decisions have been made and the adaptation conducted, as well as the number of bits spanned by the replaced value spans, endian order, and the modified value. Modified value is given by a stack expression as described above. Output length in bits can be specified through a constant or through a feature variable. The protocol allows a wide range of bitstream modifications based on adaptation decisions. A content creator can always define feature variables even when expressions are not available to evaluate the modified value. Such feature variables may include one for content and another for length to denote the correct bitstream for each adaptation possibility.

Pointers may exist in the compressed bitstream, where the pointers specify locations of other parts of the bitstream or lengths of certain bitstream segments. Omitting atoms as part of the adaptation process may make location/length information invalid. To keep the adapted bitstream consistent and decodable, relevant fields in the bitstream may be modified when atoms are dropped. As the adaptation engine modifies the bitstream, offset/location information may be provided in resource description metadata. The resource descriptor allows specifying locations in the bitstream where offsets occur, but does not specify these values.

Figure 25D:
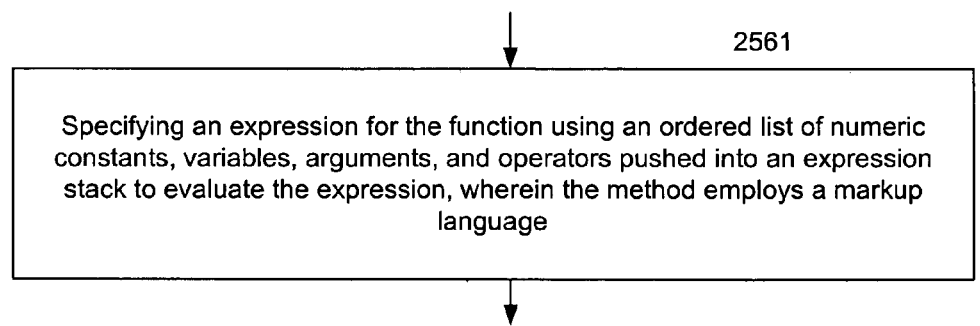
FIG. 25D is an alternate embodiment showing processing functions at a format independent adaptation engine according to the present invention.
Figure 25A:
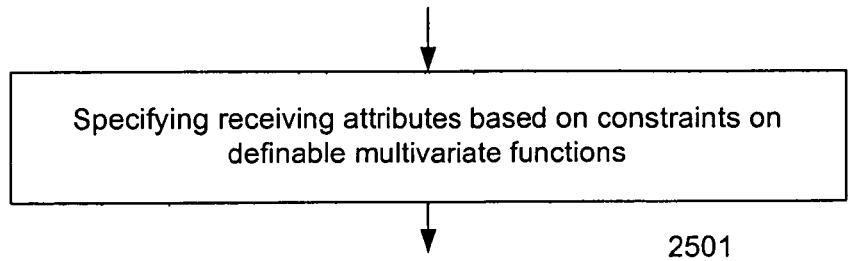
FIG. 25A illustrates an embodiment of applying a receiving attribute at a receiving destination according to the present invention.
Figure 25B:
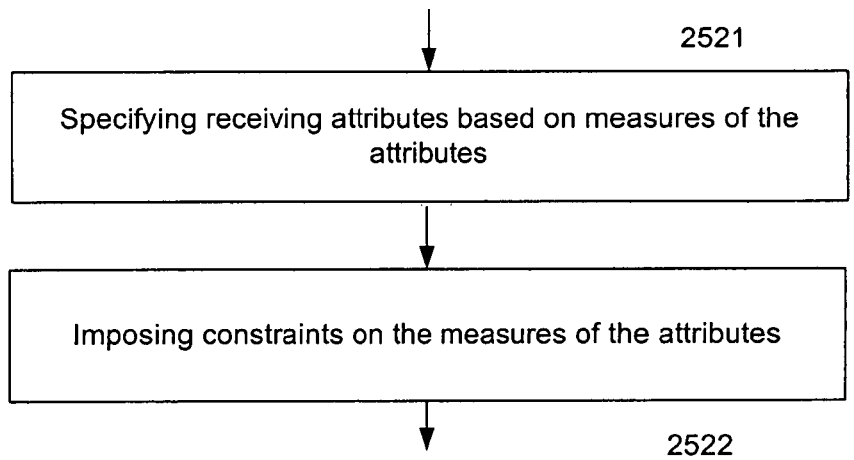
FIG. 25B is an alternate embodiment enabling comparison between scaling attributes and receiving attributes at a receiving destination according to the present invention.
Figure 25C:
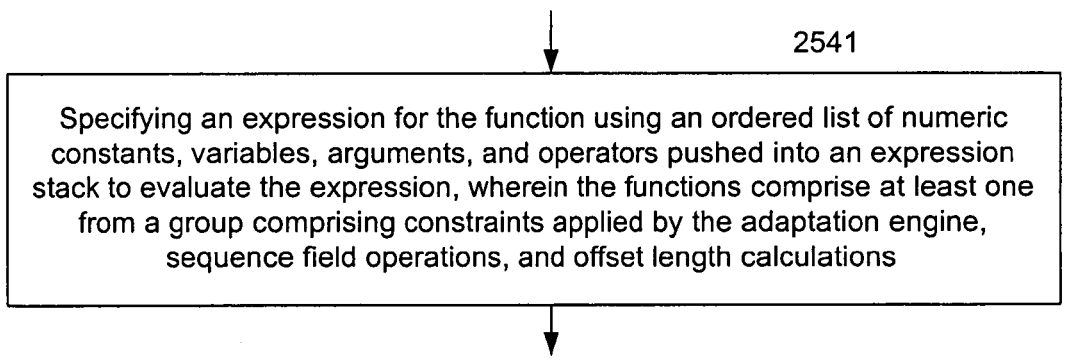
FIG. 25C is an embodiment of processing functions at a format independent adaptation engine according to the present invention.

FIG. 25A-D illustrates four embodiments of the current design. From FIG. 25A, the method for applying at least one receiving attribute at a receiving destination comprises specifying receiving attributes based on constraints on definable multivariate functions as shown in block 2501. The receiving destination may be, for example, a transcoder or adaptation engine or other receiving apparatus. From FIG. 25B, the embodiment illustrates a method for enabling comparison between scaling attributes at a receiving destination comprises specifying receiving attributes based on measures of the attributes at point 2521, followed by imposing constraints on the measures of the attributes at point 2522. FIG. 25C shows an embodiment of a method of processing functions as a format independent adaptation engine in a network using XML syntax, where the method comprises specifying an expression for the function using an ordered list of numeric constants, variables, arguments, and operators pushed into an expression stack to evaluate the expression at point 2541, wherein the functions comprise at least one from a group comprising constraints applied by the adaptation engine, sequence field operations, and offset length calculations. An embodiment of a method of processing at least one predetermined function at a format independent adaptation engine is shown in FIG. 25D. The method comprises specifying an expression for the function using an ordered list of numeric constants, variables, arguments, and operators pushed into an expression stack to evaluate the expression as shown at point 2561, wherein the method employs a markup language.

Sequences

The present design provides a compact description of a compressed resource bitstream that allow automatic update of fields having a need for decoding sequences by a format independent descriptor processing engine without need for decoding the compressed stream.

Bitstream fields may contain sequential counters, such as packet number fields in data packets or frame number (temporal reference) fields associated with compressed video frames. When the network drops bitstream segments as part of a format agnostic adaptation process, the network may update sequential counters accordingly for consistency. The sequence data descriptor element, forming part of the resource description metadata, allows a compact specification of counter field locations and the method of updating counter fields dated. This compact specification enables a format agnostic processing engine to process the metadata and update the counter fields.

With respect to sequences in particular, each sequence is associated with a sequence value. The resource description metadata specifies the starting value of the sequence and the step value of the sequence. Within a sequence, sequence count elements are associated with a location in the bitstream and length in bits, both specified in the descriptor. Sub-sequences can be embedded recursively within the sequence. The start value of a sub-sequence may be relatively derived from the sequence value of the parent sequence. All sequence count elements and non-empty sub-sequences in the sequence receive a unique sequence value, beginning from the start value of the sequence and incremented by the step value. Optionally, the sequence may have a modulo value specified. In one embodiment, if the sequence value is equal to or exceeds the modulo value, the remainder (modulus) obtained by dividing the sequence value into the modulo value becomes the new sequence value. For example, if the starting value of the sequence is s, and the step value of the sequence is p, the modulo value is m, and there are n elements in the sequence, for the ith element (i=0, . . . , n−1), the sequence value becomes (s+i*p) mod m. For a sequence count element, the network may update the sequence value without updating the sequence value's associated field.

After a transcoder performs an adaptation based on dropping bitstream segments, sequence count fields may point to dropped data. Updating and correcting of the sequence fields in the bitstream depend on whether the sequence is packable or nonpackable. In the case of a packable sequence, when a sequence count fields point to dropped data, the network removes the count element from the sequence and updates the subsequent sequence fields. For a nonpackable sequence, the count field is replaced with a count-only field. Replacing a count field with a count-only field increments the sequence value for the dropped element. Similarly, when all of the elements in a sub-sequence point to dropped data, if the parent sequence is marked as packable, the network removes the sub-sequence element from the sequence. If the parent sequence is marked as nonpackable, the network replaces the sub-sequence element with a count-only field in the parent sequence so that the sequence value will still be incremented.

For a non-packable sequence having count-only fields and no sequence count or sub-sequence elements, the network designates the sequence an empty sequence. The network does not use an empty sequence for sequence value incrementing of the parent sequence, and the empty sequence can be removed from the parent sequence.

The starting value of a sub-sequence could be relative or absolute with respect to the parent sequence. For example, if the sub-sequence has value v1 assigned as the sequence data from the parent sequence, and the sub-sequence has a starting value of s1, the actual starting value for the sub-sequence will be v1+s1 if the network uses a relative starting value. If the network uses an absolute starting value, the starting value for the sub-sequence will be s1.

The network may also provide write fields in a sequence that will write the current sequence value or the number of elements up to the current position to the resource. The write field can occur any position in the sequence. However, the write field will not be counted as a count field, or in other words the sequence value will not increment by the write field.

The resource description metadata for specifying the sequence data are as follows. addressTypeEnum is the type used to indicate address type, having possible values relative and absolute. endianTypeEnum is the type used to indicate the endian type for the value, including possible types big and small, representing big endian and small endian, respectively.

attrGroupPosAdd is an attribute group having two attributes, start and addressType. start is a mandatory attribute, a long integer indicating the starting address. addressType is an optional attribute where the value absolute indicates the start of the address is absolute address. If the value is relative, the start address is a relative address.

attrGroupPosAddLen is an attribute group including the attribute group attrGroupPosAdd plus the additional mandatory attribute length, an unsigned long integer indicating the length of the segment in bits or bytes depending on the context used. attrGroupPosAddLenBit includes the attribute group attrGroupPosAddLen described above, plus the additional optional attributes bitPos, signed, and endian. bitPos is an unsigned byte integer indicating the starting bit position of the address. A bitPos value of n indicates that the address starts at the n-th bit of the starting address specified by the start attribute, and the address spans the number of bits specified by the length attribute. The MSB (most significant bit) of a byte is assumed to be bit 0 (n =0), while the LSB (least significant bit) is assumed to be bit 7 (n=7). The signed attribute is a Boolean type indicating whether the stored value at the address in the resource is a signed value or an unsigned value. If the value is a signed value less than zero, the network stores the value using 2's compliment. The endian attribute uses type endianTypeEnum described earlier, and can be either big or small. If the attribute value is big, the network employs the big endian method for the value stored on the resource. If the endian attribute value is small, the network uses the small endian method for the value stored on the resource.

sequenceDataType is a type describing the sequence data, and can have the values startValue, stepValue, modulo, pack, countfield, subsequence, and countOnly. startValue is an optional long integer representing the start value of the sequence data. stepValue is also an optional long integer representing the step value of the sequence data. The network may increment the sequence value for each child element including countField, subsequence, and countOnly elements. modulo is an optional integer indicating the maximum value of the sequence. If the sequence value is equal to or exceeds the value for attribute modulo, the network uses the remainder, or modulus, obtained by dividing the sequence value into the modulo value as the new sequence value pack is an optional Boolean attribute, where a value of true represents the child element, countField or subsequence, of the sequence data pointing to dropped field on the resource. The child element address of the field is relative to the last field of the parent sequence. If no parent sequence exists, the starting address is relative to zero. type is an optional attribute with a default equal to count. If the value value of the attribute type is count, the network writes the current count of child elements up to the writeField including countField, subsequence, and countonly elements. If the value of the attribute type is seqValue, the network writes the current sequence value up to this writeField to the resource. The sequence value is typically not incremented for this writeField.

In the current implementation, four types of sequences may exist: a countOnly sequence, a countField sequence, a subsequence, and a writeField. More than one of the four foregoing sequence types may be included in a sequence, and processing generally accounts for the presence of more than one sequence type.

countField indicates a count field in the sequence, and uses attribute group attrGroupPosAdd LenBit to indicate the target field location, length, and address type. If the address type is relative, the starting address is relative to the previous countField or writeField element or the last element in the previous subsequence element. If the countField is the first in the sequence, the starting address of the field is relative to the last field in the parent sequence. If no parent sequence exists, the starting address is relative to zero. The attribute write is an optional Boolean attribute where a value of false indicates the network is not to write the sequence data to the resource. If false, the network increments the sequence data by the step value for this countField element.

subSequence indicates a sub-sequence within the sequence data. subSequence uses type sequenceDataType, and the network increments the sequence data by the step value for this subSequence element. countOnly indicates a count only field that may result from a dropped field. The network writes no sequence data to the resource, and the network increments the sequence data by the step value for this countOnly element. Hence the countOnly field provides a count without any sequence data, and the network counts the countOnly field but does not process the field.

The element sequenceData is used in a resource description to describe sequence data. sequenceData may have any number of child element sequences with type sequenceDataType described earlier. If no sequence data is specified, the sequenceData element could be dropped.

XML examples of the sequence aspect of the present design include the following:

```
<sequence startValue="10" stepValue="2">
    <countField start="10000" length="16" addressType="absolute" />
    <countField start="5000" length="16" addressType="relative" />
    <countField start="1000" length="16" addressType="relative" />
    <countField start="2000" length="16" addressType="relative" />
</sequence>
```

The foregoing example writes a value of 10 to address 10000, value 12 to address 15000, value 14 to address 16000, and value 16 to address 18000. All fields are two bytes long in the resource.

```
<sequence startValue="0" stepValue="1">
    <countField start="20000" length="8" addressType="absolute" write="false"/>
    <countField start="6000" length="8" addressType="relative" write="false" />
    <countField start="4000" length="8" addressType="relative" write="false" />
    <countField start="3000" length="8" addressType="relative" write="false" />
    <writeField start="2000" length="8" addressType="relative" />
    <countField start="4000" length="8" addressType="relative" write="false" />
    <countField start="8000" length="8" addressType="relative" write="false" />
</sequence>
```

This example writes value 4 to address 35000 for the writeField element, as four countField elements exist prior to the writeField element. The field is one byte in length, and no other fields are updated since all other countField elements have write attributes set false.

```
<sequence startValue="0" stepValue="6">
    <finalCount start="60000" length="8" addressType="absolute" writeNumber="false" />
    <subSequence startValue="0" stepValue="1" pack=-"false">
        <countField start="1000" length="8" addressType="relative" write="true" />
        <countField start="1000" length="8" addressType="relative" write="true" />
        <countField start="1000" length="8" addressType="relative" write="true" />
        <countField start="1000" length="8" addressType="relative" write="true" />
        <countField start="1000" length="8" addressType="relative" write="true" />
        <countField start="1000" length="8" addressType="relative" write="true" />
    </subSequence>
    <subSequence startValue="0" stepValue="1" pack=-"false" relativeStart="false">
        <countField start="1000" length="8" addressType="relative" write="true" />
        <countOnly/>
        <countOnly/>
        <countField start="1000" length="8" addressType="relative" write="true" />
        <countOnly/>
        <countOnly/>
    </subSequence>
    <subSequence startValue="0" stepValue="1" pack=-"false" modulo="8">
        <countField start="60000" length="8" addressType="relative" write="true" />
        <countField start="1000" length="8" addressType="relative" write="true" />
        <countField start="1000" length="8" addressType="relative" write="true" />
        <countOnly/>
        <countOnly/>
        <countOnly/>
        <writeField start="4000" length="8" addressType="relative" type="count" />
    </subSequence>
</Sequence>
```

This example writes the value 0 to address for the writeField element. The field is one byte long. For the first sub-sequence, the network writes the value 0+0=0 to address 61000, value 1 to address 62000, value 2 to address 63000, and so on up to value 5 to address 66000. All fields are one byte long. For the second sub-sequence, since the relativeStart attribute is false, the network writes the value 0 to address 67000 and value 3 to address 68000. All fields are one byte long. For the third sub-sequence, since the relativeStart attribute defaults to true, the network writes the value (12+0) mod 8=4 to address 128000, value 5 to address 129000, and value 6 to address 130000. All fields are one byte long. For the writeField element, since 6 child elements, including countfield and countOnly elements exist up to this writeField, the network writes the value 6 to address 134000. For all three sub-sequences, as the pack attribute values are false, any countField dropped from adaptation in the sub-sequence will change the countField to the CountOnly field. Since the parent sequence uses pack attribute default true, dropping all countField elements in the sub-sequence removes the sub-sequence from the sequence.

Scalable bitstreams and some nonscalable bitstreams operating in scalable modes can be adapted to a lower version by dropping bitstream segments and repacking. In addition to dropping segments, the network updates fields to create a compliant and adaptable bitstream. The present design includes a fully format agnostic adaptation engine having a compact description of updating fields used in the described manner to update sequence fields without the need for unpacking or decoding the bitstream.

Figure 21:
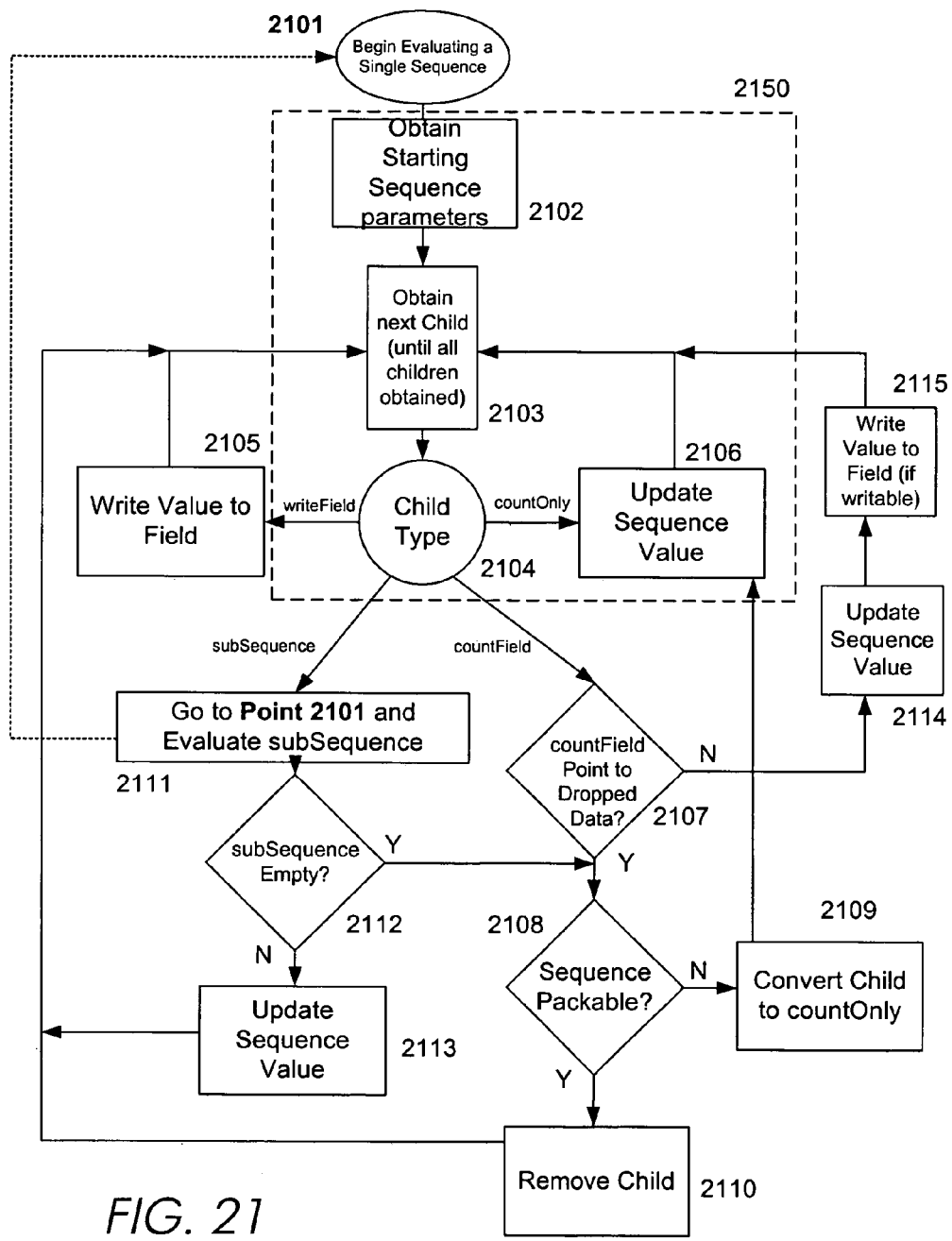
FIG. 21 illustrates an embodiment of sequence and subsequence updating according to the present invention.

One embodiment of the operation of sequence field updating is presented in FIG. 21. From FIG. 21, the network initially begins evaluating a single sequence. Point 2102 obtains starting sequence parameters, such as sequence value, modulo, stop, and/or other relevant parameters. Point 2103 obtains the next child, and begins at this point recursively until all children in the sequence have been obtained. Children of the sequence may be either writeField, countOnly, subSequence, or countField. The network evaluates at point 2104 the type of the present child. If the child is a writeField, the network at point 2105 writes the value to the field. If the child is countOnly, the network updates the sequence value at point 2106. If the child is a countField, the network determines at point 2107 whether the countField points to dropped data. If so, the network determines whether the sequence is packable at point 2108. If the sequence is packable, the network at point 2110 removes the child. If the sequence is not packable, the network at point 2109 converts the child to countOnly, and updates the sequence value at point 2106, and cycles back for the next child at point 2103. If point 2107 determines the countField does not point to dropped data, point 214 updates the sequence value, and point 215 writes the value to the field, assuming the field is writable. If the field is not writable, it only updates the sequence value. If point 2104 determines the child type is subSequence, point 2111 goes to point 2101 and proceeds through the flowchart using the same functions and evaluations as if the subsequence were a sequence. For example, point 2102 obtains starting subSequence parameters, point 2103 obtains the next child until all children have been obtained, and so forth. As may be appreciated, subSequences are simply small sequences, having similar parameters and attributes to sequences, and they must be evaluated in generally the same manner as sequences. The network determines at point 2112 whether the subSequence is empty. If the subSequence is empty, or a subSequence of a subSequence, and so forth, the network progresses to point 2108 and determines whether the sequence, not the subSequence, is packable, and proceeds as in the case of the sequence. If point 2112 determines the subSequence is not empty, it updates the sequence value and proceeds.

From FIG. 21, as shown by the dotted line labeled 2150, the method for evaluating a sequence comprises obtaining starting sequence parameters, obtaining all children of the sequence, evaluating the child type of each sequence obtained, and selectively updating sequence values based on the child type of each sequence child obtained.

Figure 23A:
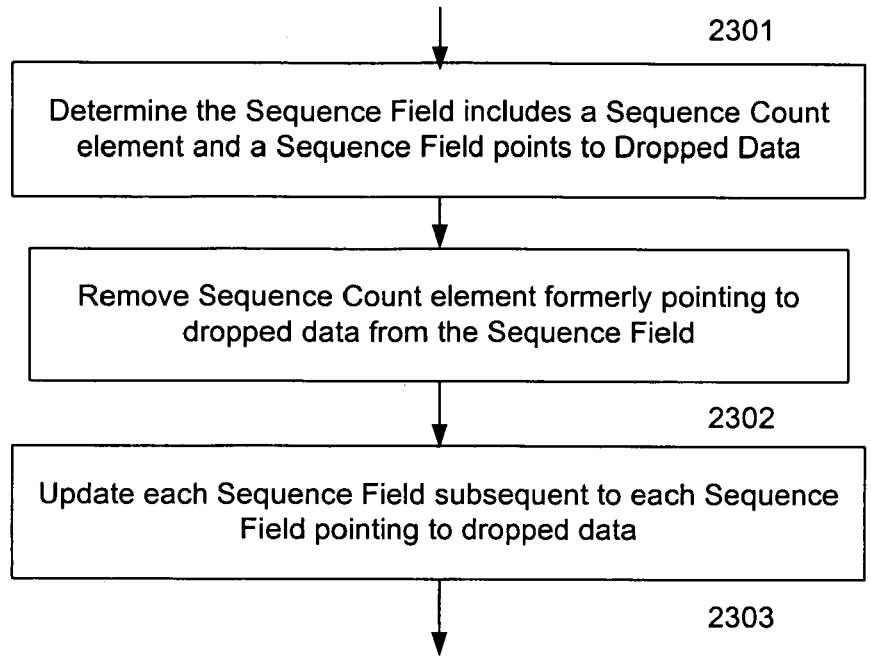
FIG. 23A illustrates an embodiment of the method of sequence updating according to the present invention.

FIG. 23A illustrates one embodiment of the current sequence updating invention. From FIG. 23A, the method determines that at least one sequence field includes a sequence count element and at least one field points to dropped data at point 2301. At point 2302, the method then removes each sequence count element formerly pointing to dropped data from the sequence field. At point 2303, the method updates each sequence field subsequent to each sequence field pointing to dropped data.

Figure 23B:
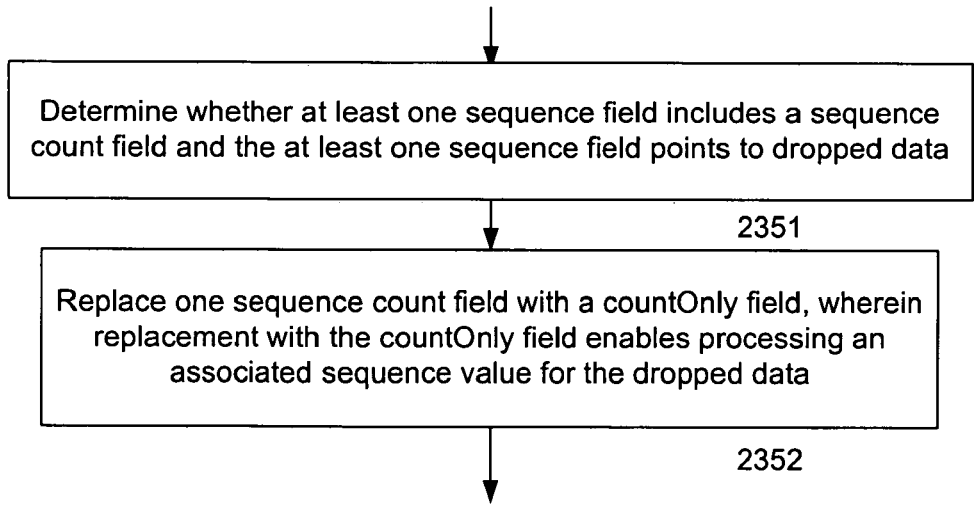
FIG. 23B is an alternate embodiment of the method of sequence updating according to the present invention.

FIG. 23B shows an alternate embodiment of the current sequence updating invention. As shown in FIG. 23B, the method initially determines whether at least one sequence field includes a sequence count field and the at least one sequence field points to dropped data at point 2351. At point 2352, the system replaces one sequence count field with a countOnly field, wherein replacement with the countOnly field enables processing an associated sequence value for the dropped data.

Offsets and Length Fields

Figure 20:
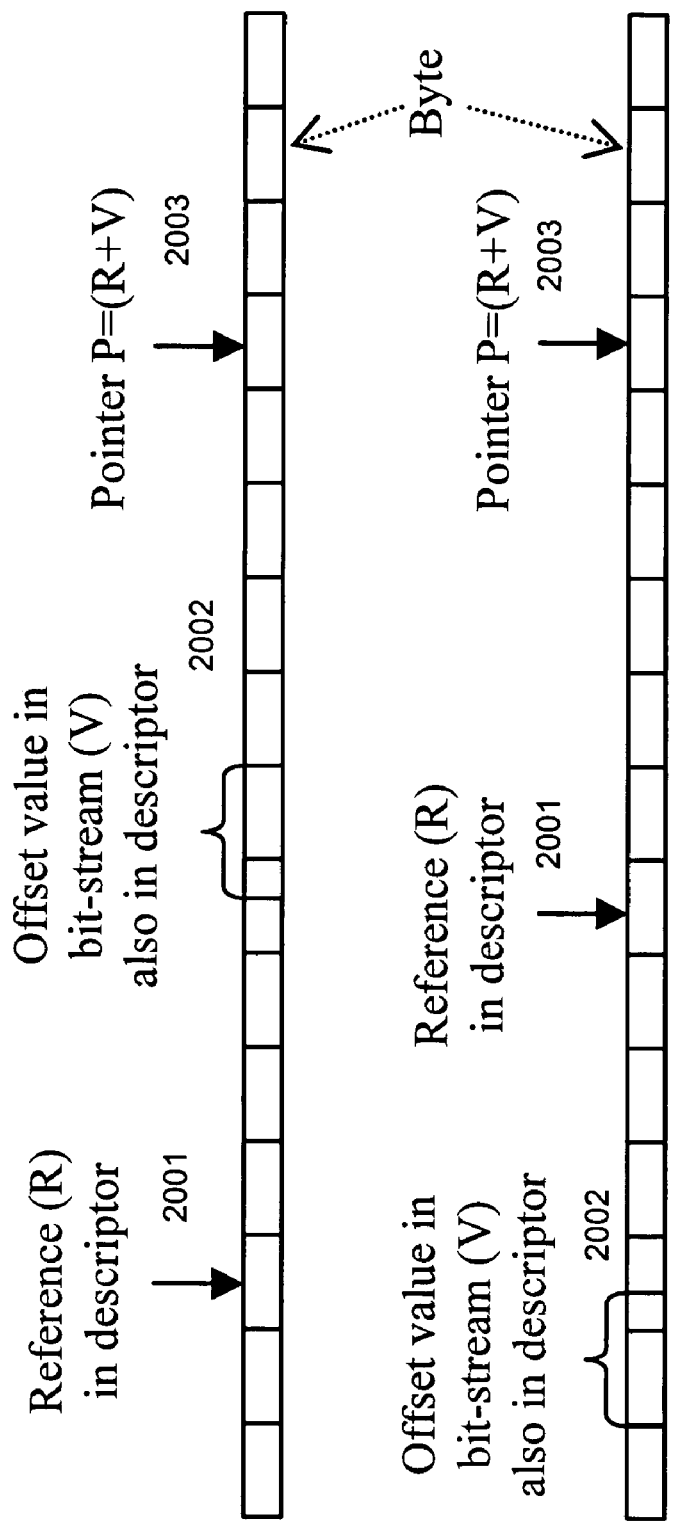
FIG. 20 shows an example embodiment of codec offset data and compensation therefore.

Locations and lengths can be expressed as offsets from a given reference point. FIG. 20 illustrates an embodiment of the resource descriptor specifying a reference point R 2001 in the bitstream, the exact location in bitstream, the length in bits and endian type where the value of an offset field is stored in the bitstream, along with the numeric value V 2002 stored in this field. The numeric value is redundant, but may be included in the descriptor for convenience of implementation. The values R and V together provide the location of another point P 2003 in the bitstream, where P32 R30 V. Alternatively, the numeric value V 2002 provides the length of a bitstream segment from R through P including R but excluding P, or excluding R but including P. For example, if reference point R 2001 has a value of 10000, and numeric value V 2002 is 620, point P 2003 has the value 10620. In the alternative case, if reference point R 2001 is again 10000, and point P 2003 has the value 10620, numeric value V provides the length from R through P, including point 10000 but excluding point P, 10620, or the length from 10000 through 10619, a total of 620. Otherwise, this value can exclude R, or 10000, and include P, 10620, namely the length from 10001 through 10620, again a value of 620.

The adaptation engine may modify the field as bitstream segments are dropped by the adaptation engine in order to update the value of the difference P–R based on reference point R 2001, the location of an offset/length field in the bitstream, and the numeric value V 2002 stored therein. First, if the network drops the field where an offset or a part of the offset is stored as part of adaptation, the entire entry corresponding to the field may be removed from the descriptor as the field no longer needs to be manipulated. Second, if the network removes either the byte at reference point R 2001 or the bytes at point P 2003, or both, as part of adaptation, the field where the offset is stored may still remain valid, as long as no bytes around or between R and P have been dropped. For these situations, the descriptor may describe pointer updating before the new value of numeric value V 2002 can be computed and updated in the resource. Invalid pointers R or P can be moved up to the next valid byte or moved down to the previous valid byte, and the descriptor may designate one of these updating options. The result of the updated value V can differ based on the designation of moving the invalid pointer up or down. The numeric value V 2002 stored in the field may alternately be zeroed when either R or P becomes invalid. The semantics of the offset field in a given bitstream determines handling invalid pointers, and the descriptor may mention the handling technique desired.

For example, a bitstream may contain a length field. If the offset field indicates the length of R through P including R but excluding P with R less than P, then both R and P may be moved up, or moved to the next valid byte, when invalid. For example, assume again a value of R of 10000 and a value of P of 10620. If the value of V, 620, is available after adaptation, and represents the length of R through P including R but excluding P, the value of R may be lost as a result of adaptation. The network may compute the value of R knowing the values of V and P, and may move both R and P to the next valid byte. Alternatively, if the offset field indicates the length of R through P excluding R but including P with R less than P, then both R and P may be moved down, or moved to the previous valid byte, when invalid.

Figure 22A:
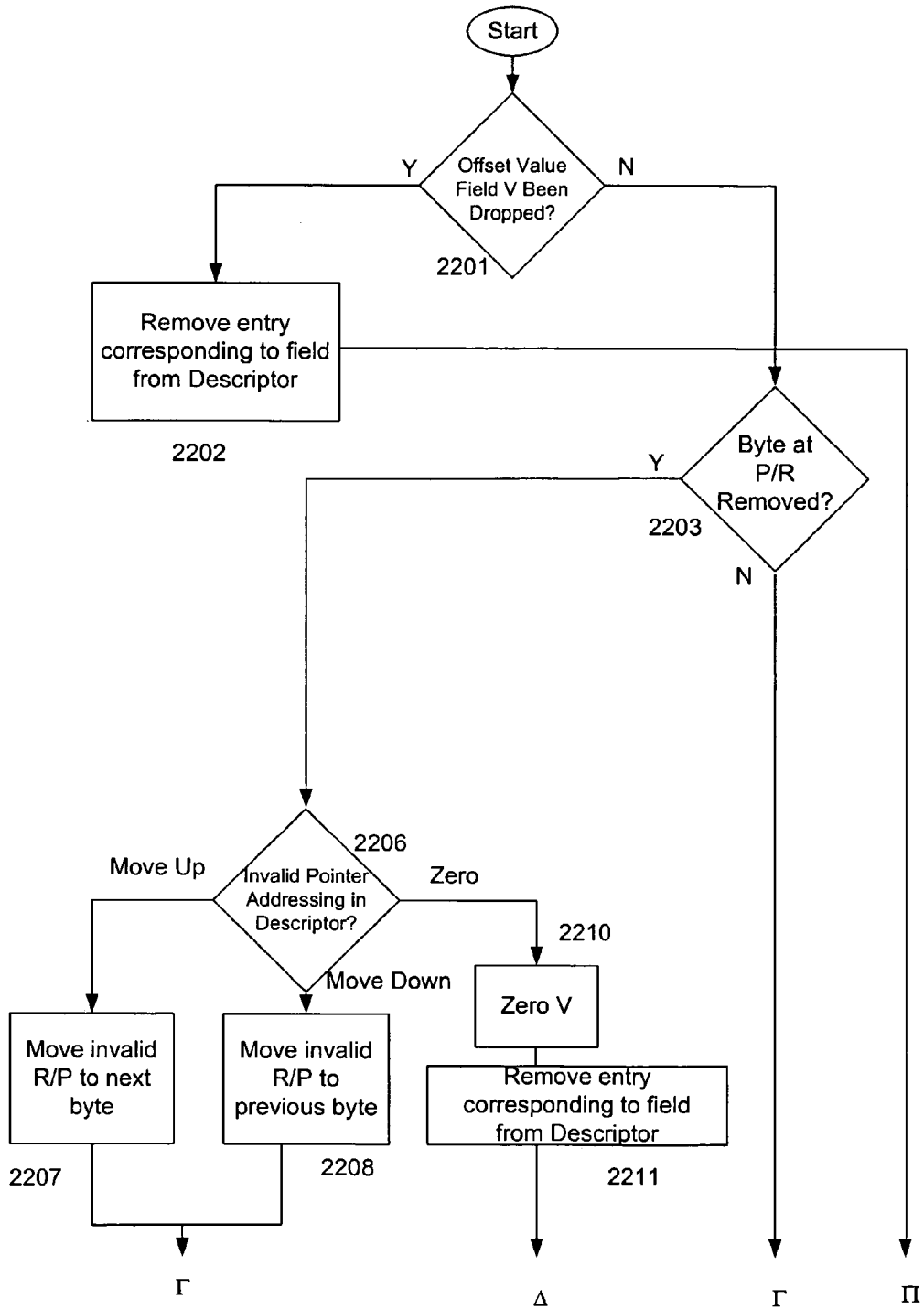
FIGS. 22A and 22B are an embodiment of the offset and length updating according to the present invention.
Figure 22B:
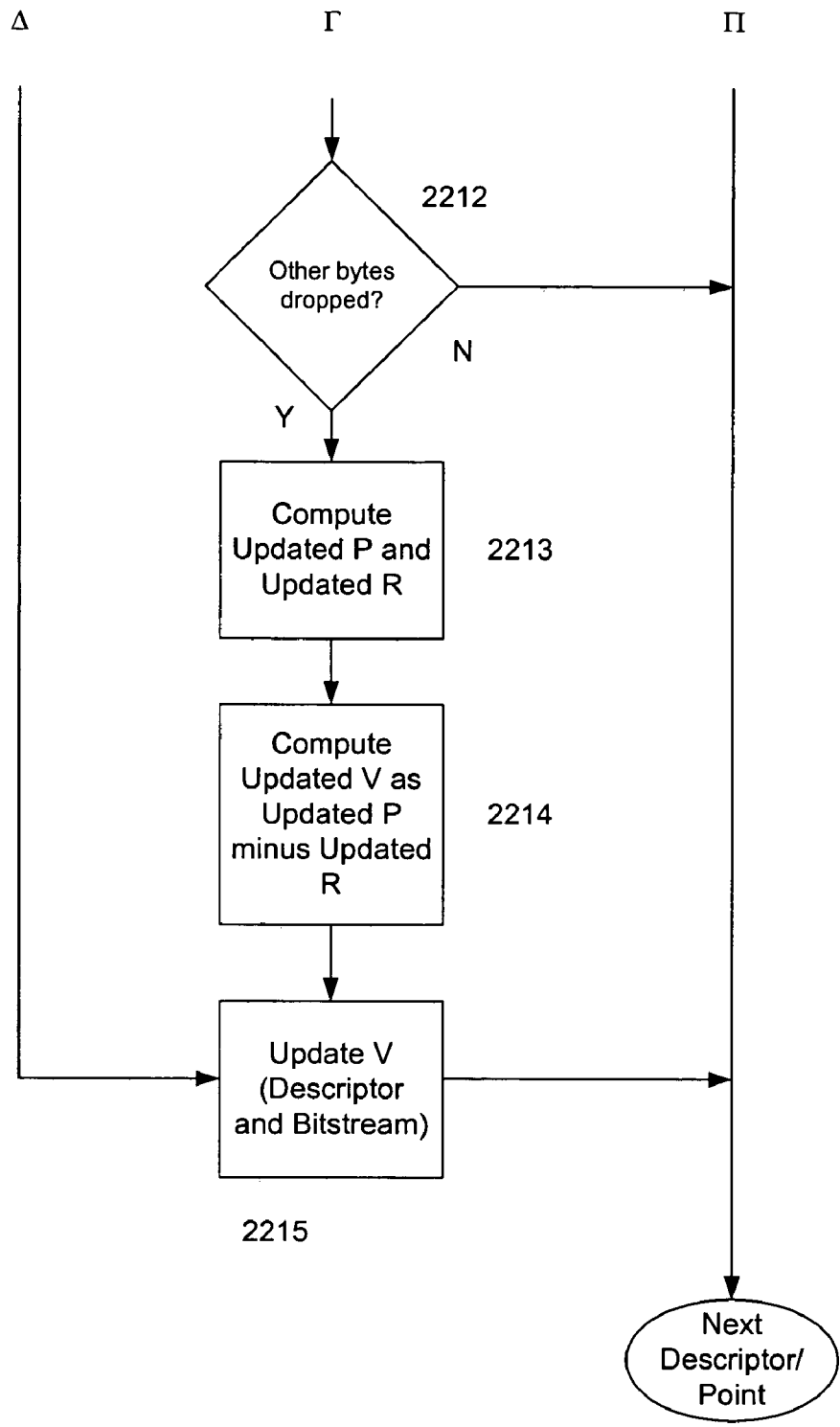

FIGS. 22A and 22B illustrate a flowchart of an embodiment of automatic offset and length updating according to the present design. Automatic updating uses a format independent descriptor processing engine without need for decoding the compressed resource bitstream. Initially, the network evaluates at point 2201 whether the field where the offset value is stored has been partially or completely dropped. If so, point 2202 removes the entry corresponding to the field from the descriptor. If not, point 2203 evaluates whether the byte at P and/or the byte at R has been removed as part of the adaptation. If not, operation progresses as shown in FIG. 22B. If the byte at P and/or the byte at R has been removed as part of the adaptation point 2206 assesses the mode of operation for addressing the invalid pointer in the descriptor. Options available are moving the data to the next valid byte, moving the data to the previous valid byte, or zeroing the data. If point 2206 determines invalid pointers are to be moved up, the invalid pointers are moved to the next byte at point 2207, and processing progresses as shown in FIG. 22B. If point 2206 determines invalid pointers R and/or P are to be moved down based on information in the descriptor, then point 2208 moves invalid pointers R and/or P to the previous byte, and again processing progresses as shown in FIG. 22B. If point 2206 determines the descriptor requires zeroing of V stored in the field when R and/or P becomes invalid, then point 2210 zeroes the value of V stored in the field. Point 2211 removes the entry corresponding to the field from the descriptor.

From FIG. 22B, if V is to be zeroed, and points 2210 and 2211, processing progresses at point 2215. If the offset value has not been dropped, subsequent to executing point 2202, the network moves to the next descriptor or point. If the network has executed points 2207, 2208, or the byte at point P and/or point R has not been removed, the network checks for data drops for bytes around R and P at point 2212. The reason for this evaluation is that the presence of dropped data may make the values of P, R, and V invalid even if those values are not dropped during adaptation. In other words, an offset may be altered if intervening points are dropped, or if a reference point is not in a known position. Point 2213 computes updated values of P and R, while point 2214 computes an updated value of V based on the newly computed P and R. Point 2215 updates V, in both the descriptor and bitstream, based on all newly computed values.

One embodiment according to the design presented in FIGS. 22A and 22B entails performing the evaluations at points 2201, 2203, 2212, and 2215. In such a design, the method updates an offset in a bitstream subsequent to bitstream segment drops using a descriptor comprising descriptor data. Descriptor data comprises a reference point in the bitstream and a numerical offset value from the reference point in the bitstream, said reference point and said numerical offset value having the ability to determine a pointer. The method comprises determining whether the numerical offset value has been dropped, determining whether at least one of the pointer and the reference point have been removed when the numerical offset value has not been dropped, determining whether bytes proximate to the pointer and the reference point have been removed, and updating the numerical offset value when at least one of the pointer and the reference point have been removed or bytes proximate to the pointer and the reference point have been removed.

According to the foregoing description of offset and length fields, certain attributes may be employed, including the addressTypeEnum, endianTypeEnum, attrGroupPosAdd, attrGroupPosAddLen, and attrGroupPosAddLenBit attributes described above. Further attributes include invalidPointerHandlingType, a type indicating how to handle a pointer that points to a dropped byte. Three possible values exist for invalidPointerHandlingType, namely moveUp, moveDown, and zeroOut. moveUp moves the pointer to point to the next valid byte, moveDown moves the pointer to the previous valid byte, and zeroOut sets the pointer to zero. offsetEntry is an element describing one offset entry. Each offsetEntry uses attribute group attrGroupPosAddLenBit to specify the location and length in bits, the starting bit position of the entry, its endian type and its signed/unsigned type. If the value of attribute addressType in the attribute group is relative, the starting address of the entry is relative to the starting address of the parent offset reference element. The offset value stored in the resource is relative to the starting address of the starting address of the parent offset reference element.

Each offsetEntry also has the attributes value and invalidPointerHandling. The attribute value will be the same value on the resource pointed by the offsetEntry. invalidPointerHandling specifies handling the situation where value points to a dropped byte. invalidPointerHandling uses type invalidPointerHandlingType described earlier offsetReferenceDataType is a type describing the offset reference. Each may have any number of child element offsetEntry described earlier. Each offsetReference element uses attribute group attrGroupPosAdd to indicate the starting address of the offsetReference, and its address type using attributes start and addressType in the attribute group respectively. If the value of attribute addressType in the attribute group is relative, the starting address is relative to the starting address of the previous offset reference. If the offset reference is the first one, it is relative to zero (0).

codecOffsetData is used in the resource description to describe codec offset data. codecOffsetData may have any number (including zero) of child element offsetReference with type offsetReferenceDataType described earlier. If no codec offset data exists to specify, the codecOffsetData element may be dropped.

An XML example of the offset aspect of the present design is as follows.

```
<codecOffsetData>
    <offsetReference start="85000" addressType="relative">
        <offsetEntry value="10000" start="2" length="16"
    addressType="relative" invalidPointerHandling="moveUp" />
        <offsetEntry value="20000" start="4" length="16"
    addressType="relative" invalidPointerHandling="moveUp" />
    </offsetReference>
    <offsetReference start="3000" addressType="relative">
        <offsetEntry value="-8000" start="2" length="20"
    addressType="relative" invalidPointerHandling="moveUp" />
        <offsetEntry value="30000" start="4" bitPos="4" length="20"
    addressType="relative" invalidPointerHandling="moveUp" />
        <offsetEntry value="50000" start="7" length="20"
    addressType="relative" invalidPointerHandling="moveUp" />
    </offsetReference>
</codecOffsetData>
```

The codec offset data has two offset references. The first offset reference has two entries and the second has three entries. The first offset reference starts at address 85000+0=85000, and the second offset reference starts at address 3000+85000=88000. The last offset entry in the second offset reference starts at address 7+88000=88007, and lasts for 20 bits. The value stored at address 88007 is the relative address to 88000, treated as a signed value.

Scalable bitstreams and some nonscalable bitstreams operating in scalable modes can be adapted to a lower version by dropping bitstream segments and repacking. In addition to dropping segments, the network updates fields to create a compliant and adaptable bitstream. The present design includes a fully format agnostic adaptation engine having a compact description of updating fields used in the described manner to update offsets and length fields without the need for unpacking or decoding the bitstream.

Figure 24A:
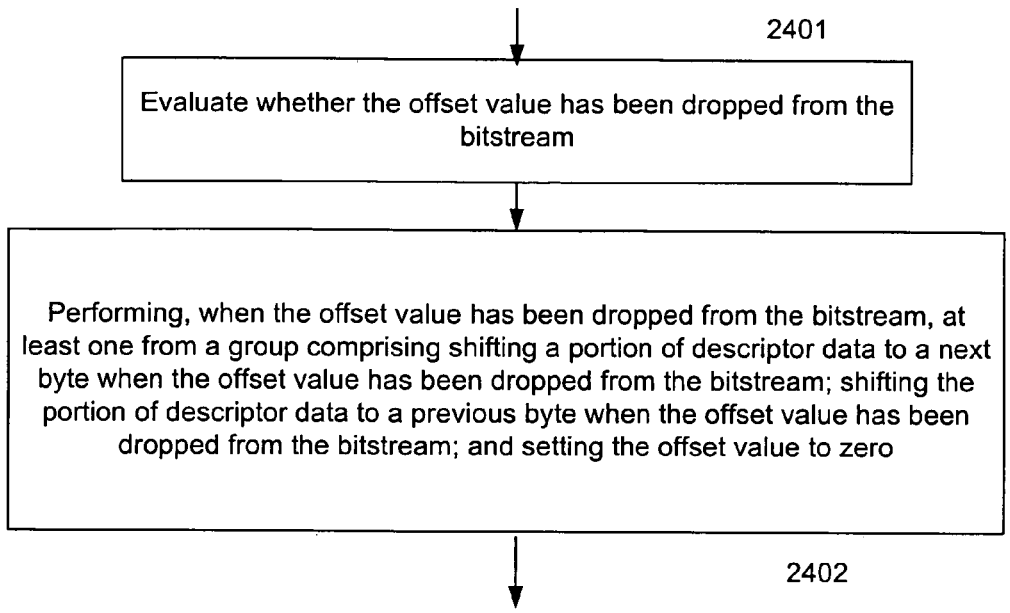
FIG. 24A is an embodiment of the offset field updating according to the present invention.

FIG. 24A shows one embodiment of the offset field updating. From FIG. 24A, the method for updating an offset in a bitstream subsequent to bitstream segment drops uses a descriptor. The descriptor comprises descriptor data, where descriptor data comprises a reference point in the bitstream and a numerical offset value from the reference point in the bitstream, the reference point and the numerical offset value having the ability to determine a pointer. The method comprises evaluating, at point 2401, whether the offset value has been dropped from the bitstream. At point 2402, the method performs, when the offset value has been dropped from the bitstream, at least one from a group comprising shifting a portion of descriptor data to a next byte when the offset value has been dropped from the bitstream, shifting the portion of descriptor data to a previous byte when the offset value has been dropped from the bitstream, setting the offset value to zero.

Figure 24B:
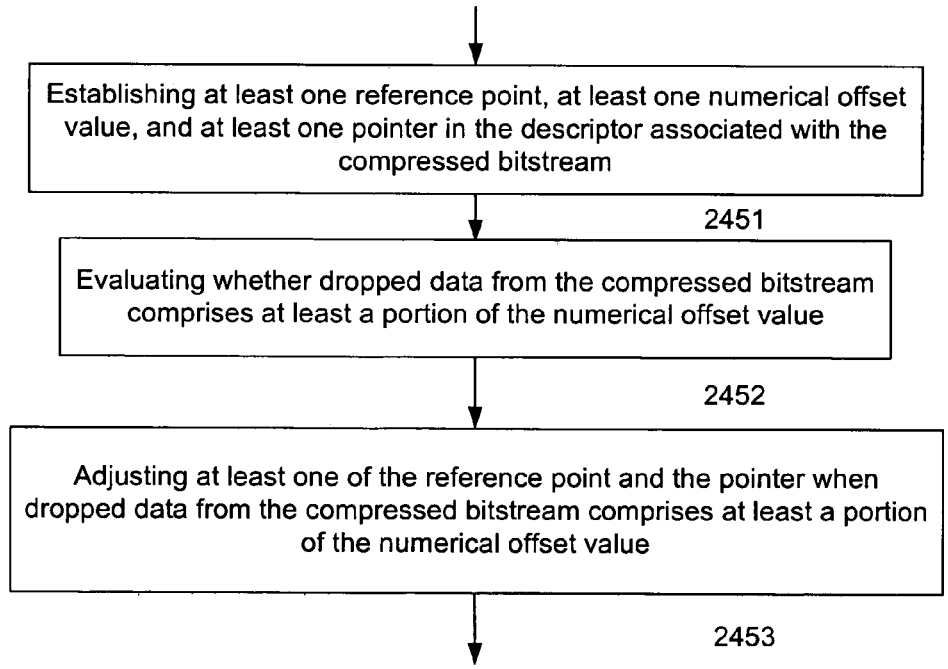
FIG. 24B is an alternate embodiment of the offset field updating according to the present invention.

FIG. 24B is an alternate embodiment of offset field updating, where point 2451 establishes at least one reference point, at least one numerical offset value, and at least one pointer in the descriptor associated with the compressed bitstream. Point 2452 evaluates whether dropped data from the compressed bitstream comprises at least a portion of the numerical offset value. Point 2453 then adjusts at least one of the reference point and the pointer when dropped data from the compressed bitstream comprises at least a portion of the numerical offset value.

Figure 24C:
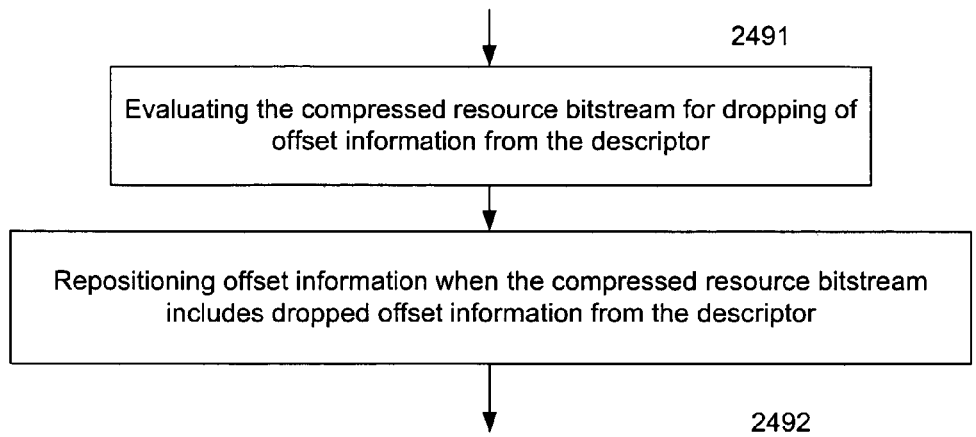
FIG. 24C is another alternate embodiment of the offset field updating according to the present invention.

FIG. 24C is another embodiment of the present offset field updating, where point 2491 evaluates the compressed resource bitstream for dropping of offset information from the descriptor. Point 2492 repositions offset information when the compressed resource bitstream includes dropped offset information from the descriptor.

It will be appreciated to those of skill in the art that the present design may be applied to other systems that employ bitstream manipulation in midstream, particularly those using transcoding of sequence fields, offsets, and length fields benefiting from a format agnostic updating mechanism and methodology. In particular, it will be appreciated that various updating schemes may be addressed by the functionality and associated aspects described herein.

Although there has been hereinabove described a method for describing mathematical expressions and functions to remote universal engines using minimal descriptor enabling format agnostic updates, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for updating sequence fields in a bitstream subsequent to bitstream segment drops, wherein at least one sequence field includes a sequence count element and the at least one sequence field points to dropped data, the method comprising:
   removing with a transcoder each sequence count element formerly pointing to dropped data from the sequence field;
   updating with the transcoder each sequence field subsequent to each sequence field pointing to dropped data; and
   wherein a sequence further comprises a specified modulo value, and wherein a sequence value equal to or exceeding the specified modulo value provides a new sequence value substantially equal to the sequence value divided into the modulo value.

2. The method of claim 1, wherein sub-sequences are embedded within at least one sequence, and wherein a sub-sequence count element is relatively derived from a sequence count element from a parent sequence.

3. The method of claim 2, wherein relatively deriving the sub-sequence count element comprises:
   determining whether the sub-sequence is relatively or absolutely positioned with respect to the parent sequence;
   selecting the sub-sequence count element as an absolute value when the sub-sequence is absolutely positioned with respect to the parent sequence; and
   selecting the sub-sequence count element as a relative value when the sub-sequence is relatively positioned with respect to the parent sequence.

4. The method of claim 1, said method comprising XML coding for said removing and updating.

5. The method of claim 1, further comprising:
   introducing a write field in at least one sequence, wherein the write field writes a current sequence value.

6. The method of claim 1, further comprising:
   introducing a write field in at least one sequence, wherein the write field writes a number of elements until a current position.

7. The method of claim 5, wherein the write field occurs at any position within the sequence.

8. A method for updating sequence fields within at least one sequence in a bitstream subsequent to bitstream segment drops, wherein at least one sequence field includes a sequence count field and the at least one sequence field points to dropped data, the method comprising:
   replacing with a transcoder one sequence count field with a countOnly field, wherein replacement with the countOnly field enables processing an associated sequence value for the dropped data;
   wherein sub-sequences are embedded within at least one sequence, and wherein a sub-sequence count element is relatively derived from a sequence count element from a parent sequence; and
   wherein the at least one sequence further comprises a specified modulo value, and wherein a sequence value equal to or exceeding the specified modulo value provides a new sequence value substantially equal to the sequence value divided into the modulo value.

9. The method of claim 8, wherein the countOnly field indicates the field is to be counted only rather than both counted and processed.

10. The method of claim 8, wherein relatively deriving the sub-sequence count element comprises:
    determining whether the sub-sequence is relatively or absolutely positioned with respect to the parent sequence;
    selecting the sub-sequence count element as an absolute value when the sub-sequence is absolutely positioned with respect to the parent sequence; and
    selecting the sub-sequence count element as a relative value when the sub-sequence is relatively positioned with respect to the parent sequence.

11. The method of claim 8, said method comprising XML coding for said removing and updating.

12. A method for updating sequences in a bitstream having dropped data located therein, each sequence comprising a sequence field having a sequence count element associated with a location in the bitstream, the method comprising:
    removing with a transcoder each sequence count element pointing to dropped data from the sequence field;
    updating with the transcoder each sequence field subsequent to each sequence field formerly pointing to dropped data to include sequence count elements pointing to associated locations in the bitstream; and wherein a sequence further comprises a specified modulo value, and wherein a sequence value equal to or exceeding the specified modulo value provides a new sequence value substantially equal to the sequence value divided into the modulo value.

13. The method of claim 12, wherein sub-sequences are embedded within at least one sequence, and wherein a sub-sequence count element is relatively derived from a sequence count element from a parent sequence.

14. The method of claim 13, wherein relatively deriving the sub-sequence count element comprises:

determining whether the sub-sequence is relatively or absolutely positioned with respect to the parent sequence;

selecting the sub-sequence count element as an absolute value when the sub-sequence is absolutely positioned with respect to the parent sequence; and selecting the sub-sequence count element as a relative value when the sub-sequence is relatively positioned with respect to the parent sequence.

15. The method of claim 12, said method comprising XML coding for said removing and updating.

16. The method of claim 12, further comprising:

introducing a write field in at least one sequence, wherein the write field writes a current sequence value.

17. The method of claim 15, further comprising:

introducing a write field in at least one sequence, wherein the write field writes a number of elements until a current position.

18. The method of claim 17, wherein the write field occurs at any position within the sequence.

19. A transcoder for evaluating sequences in a bitstream subsequent to bitstream segment drops, comprising:

a sequence count element remover, said sequence count element remover having the ability to determine whether a sequence field includes a sequence count element and the at least one sequence field points to dropped data;

a sequence field updater having the ability to update each sequence field subsequent to each sequence field pointing to dropped data;

wherein a sequence further comprises a specified modulo value, and wherein a sequence value equal to or exceeding the specified modulo value provides a new sequence value substantially equal to the sequence value divided into the modulo value.

20. A system for evaluating sequences in a bitstream subsequent to bitstream segment drops, comprising:

transcoder, comprising:

a sequence count element remover, said sequence count element remover having the ability to determine whether a sequence field includes a sequence count element and the at least one sequence field points to dropped data;

a sequence field updater having the ability to update each sequence field subsequent to each sequence field pointing to dropped data;

wherein a sequence further comprises a specified modulo value, and wherein a sequence value equal to or exceeding the specified modulo value provides a new sequence value substantially equal to the sequence value divided into the modulo value.

* * * * *

UNITED STATES PATENT AND TRADEMARK OFFICE
CERTIFICATE OF CORRECTION

PATENT NO. : 7,634,002 B2  
APPLICATION NO. : 10/724556  
DATED : December 15, 2009  
INVENTOR(S) : Debargha Mukherjee et al.

Page 1 of 1

It is certified that error appears in the above-identified patent and that said Letters Patent is hereby corrected as shown below:

In column 36, line 17, in Claim 20, before "transcoder" insert -- a --.

Signed and Sealed this

Twenty-eighth Day of December, 2010

David J. Kappos
*Director of the United States Patent and Trademark Office*